(12) United States Patent
Karaoguz et al.

(10) Patent No.: US 8,947,350 B2
(45) Date of Patent: Feb. 3, 2015

(54) SYSTEM AND METHOD FOR GENERATING SCREEN POINTING INFORMATION IN A TELEVISION CONTROL DEVICE

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 487 days.

(21) Appl. No.: 12/774,321

(22) Filed: May 5, 2010

(65) Prior Publication Data

US 2011/0063206 A1 Mar. 17, 2011

Related U.S. Application Data

(60) Provisional application No. 61/242,234, filed on Sep. 14, 2009.

(51) Int. Cl.
*G09G 5/00* (2006.01)
*G06F 17/00* (2006.01)
*G06F 3/0346* (2013.01)
*G06F 3/03* (2006.01)
*G06F 3/042* (2006.01)
*H04N 21/2343* (2011.01)
*H04N 21/2389* (2011.01)
*H04N 21/422* (2011.01)
*H04N 21/432* (2011.01)
*H04N 21/433* (2011.01)
*H04N 21/4725* (2011.01)
*H04N 21/4728* (2011.01)
*H04N 21/845* (2011.01)
*G06F 3/038* (2013.01)
(Continued)

(52) U.S. Cl.
CPC ............ *G06F 3/0346* (2013.01); *G06F 3/0304* (2013.01); *G06F 3/0325* (2013.01); *G06F 3/0428* (2013.01); *H04N 21/234318* (2013.01); *H04N 21/23892* (2013.01); *H04N 21/42204* (2013.01); *H04N 21/4325* (2013.01); *H04N 21/4334* (2013.01); *H04N 21/4725* (2013.01); *H04N 21/4728* (2013.01); *H04N 21/845* (2013.01); *G06F 3/0386* (2013.01); *H04N 5/76* (2013.01); *H04N 9/8205* (2013.01); *H04N 2005/4428* (2013.01); *H04N 2005/4432* (2013.01)
USPC .......................................... 345/156; 715/202

(58) Field of Classification Search
USPC ........................................................ 345/156
See application file for complete search history.

(56) References Cited

U.S. PATENT DOCUMENTS 5,111,511 A 5/1992 Ishii et al.
5,408,258 A 4/1995 Kolessar
(Continued)

FOREIGN PATENT DOCUMENTS

WO WO 2007/137611 12/2007

OTHER PUBLICATIONS

Office Action from related U.S. Appl. No. 12/880,530 dated Aug. 2, 2012.
(Continued)

*Primary Examiner* — Charles V Hicks
(74) *Attorney, Agent, or Firm* — Brinks Gilson & Lione

(57) ABSTRACT

A system and method, in a television control device, for generating screen pointing information, substantially as shown in and/or described in connection with at least one of the figures, as set forth more completely in the claims.

32 Claims, 10 Drawing Sheets

(51) Int. Cl.
*H04N 5/76* (2006.01)
*H04N 9/82* (2006.01)
*H04N 5/44* (2011.01)

(56) References Cited

U.S. PATENT DOCUMENTS

| | | | |
|---|---|---|---|
| 5,543,851 A | 8/1996 | Chang | |
| 5,602,568 A * | 2/1997 | Kim | 345/158 |
| 5,708,845 A * | 1/1998 | Wistendahl et al. | 715/202 |
| 5,718,845 A | 2/1998 | Drost | |
| 5,721,584 A | 2/1998 | Yoshinobu et al. | |
| 5,727,141 A | 3/1998 | Hoddie | |
| 5,793,361 A | 8/1998 | Kahn et al. | |
| 5,929,849 A | 7/1999 | Kikinis | |
| 6,097,441 A | 8/2000 | Allport | |
| 6,122,660 A | 9/2000 | Baransky et al. | |
| 6,255,961 B1 | 7/2001 | Van Ryzin et al. | |
| 6,314,569 B1 | 11/2001 | Chernock et al. | |
| 6,349,410 B1 | 2/2002 | Lortz | |
| 6,407,779 B1 | 6/2002 | Herz | |
| 6,931,660 B1 | 8/2005 | Kalluri et al. | |
| 7,053,965 B1 | 5/2006 | Fan | |
| 7,057,670 B2 | 6/2006 | Kikinis | |
| 7,102,616 B1 | 9/2006 | Sleator | |
| 7,301,530 B2 | 11/2007 | Lee et al. | |
| 7,344,084 B2 | 3/2008 | DaCosta | |
| 7,535,456 B2 * | 5/2009 | Liberty et al. | 345/158 |
| 7,536,706 B1 | 5/2009 | Sezan | |
| 7,612,748 B2 | 11/2009 | Tateuchi | |
| 7,631,338 B2 | 12/2009 | Del Sesto et al. | |
| 7,805,747 B2 | 9/2010 | Klappert | |
| 7,864,159 B2 | 1/2011 | Sweetser et al. | |
| 7,889,175 B2 * | 2/2011 | Kryze et al. | 345/156 |
| 7,890,380 B2 | 2/2011 | Stefanik | |
| 7,987,478 B2 | 7/2011 | Minor | |
| 8,095,423 B2 | 1/2012 | Nichols | |
| 8,181,212 B2 | 5/2012 | Sigal | |
| 8,223,136 B2 * | 7/2012 | Hu et al. | 345/179 |
| 8,359,628 B2 | 1/2013 | Kitaru et al. | |
| 8,421,746 B2 * | 4/2013 | Igoe | 345/156 |
| 2001/0019368 A1 | 9/2001 | Holme et al. | |
| 2001/0023436 A1 | 9/2001 | Srinivasan | |
| 2001/0047298 A1 | 11/2001 | Moore | |
| 2002/0040482 A1 | 4/2002 | Sextro | |
| 2002/0042925 A1 | 4/2002 | Ebisu | |
| 2002/0056136 A1 | 5/2002 | Wistendahl | |
| 2002/0069405 A1 | 6/2002 | Chapin et al. | |
| 2002/0078446 A1 | 6/2002 | Dakss | |
| 2002/0090114 A1 | 7/2002 | Rhoads | |
| 2002/0136432 A1 | 9/2002 | Koike et al. | |
| 2003/0005445 A1 | 1/2003 | Schein | |
| 2003/0023981 A1 | 1/2003 | Lemmons | |
| 2003/0035075 A1 | 2/2003 | Butler et al. | |
| 2003/0115602 A1 | 6/2003 | Knee | |
| 2003/0145326 A1 | 7/2003 | Gutta et al. | |
| 2003/0212996 A1 | 11/2003 | Wolzien | |
| 2003/0236752 A1 | 12/2003 | Dawson et al. | |
| 2004/0078814 A1 | 4/2004 | Allen | |
| 2004/0119701 A1 | 6/2004 | Mulligan et al. | |
| 2004/0236865 A1 | 11/2004 | Ullman | |
| 2005/0028208 A1 | 2/2005 | Ellis | |
| 2005/0153687 A1 | 7/2005 | Niemenmaa et al. | |
| 2005/0193425 A1 | 9/2005 | Sull et al. | |
| 2005/0229227 A1 | 10/2005 | Rogers | |
| 2005/0251835 A1 | 11/2005 | Scott | |
| 2005/0262542 A1 | 11/2005 | DeWeese et al. | |
| 2006/0037044 A1 | 2/2006 | Daniels | |
| 2006/0099964 A1 | 5/2006 | Barrese et al. | |
| 2006/0152489 A1 | 7/2006 | Sweetser et al. | |
| 2006/0174273 A1 | 8/2006 | Park | |
| 2006/0195878 A1 | 8/2006 | Pack et al. | |
| 2006/0241864 A1 * | 10/2006 | Rosenberg | 701/213 |
| 2007/0097275 A1 | 5/2007 | Dresti et al. | |
| 2007/0130581 A1 | 6/2007 | Del Sesto et al. | |
| 2007/0157260 A1 | 7/2007 | Walker | |
| 2007/0195205 A1 | 8/2007 | Lowe | |
| 2007/0266406 A1 | 11/2007 | Aravamudan | |
| 2007/0277201 A1 | 11/2007 | Wong | |
| 2007/0300263 A1 | 12/2007 | Barton | |
| 2008/0052750 A1 | 2/2008 | Grunnet-Jepsen | |
| 2008/0066097 A1 | 3/2008 | Park et al. | |
| 2008/0066129 A1 | 3/2008 | Katcher et al. | |
| 2008/0109851 A1 | 5/2008 | Heather | |
| 2008/0136754 A1 | 6/2008 | Tsuzaki et al. | |
| 2008/0172693 A1 | 7/2008 | Ludvig | |
| 2008/0204603 A1 | 8/2008 | Hattori | |
| 2008/0204605 A1 | 8/2008 | Tsai | |
| 2008/0209480 A1 | 8/2008 | Eide | |
| 2009/0021473 A1 * | 1/2009 | Grant et al. | 345/156 |
| 2009/0037947 A1 | 2/2009 | Patil | |
| 2009/0083815 A1 | 3/2009 | McMaster et al. | |
| 2009/0165041 A1 | 6/2009 | Penberthy et al. | |
| 2009/0165048 A1 | 6/2009 | Nishimura | |
| 2009/0187862 A1 | 7/2009 | DaCosta | |
| 2009/0217317 A1 | 8/2009 | White | |
| 2009/0235312 A1 | 9/2009 | Morad | |
| 2009/0237572 A1 | 9/2009 | Kishimoto | |
| 2010/0064320 A1 | 3/2010 | Angiolillo et al. | |
| 2010/0098074 A1 | 4/2010 | Kokemak | |
| 2010/0157152 A1 | 6/2010 | Weitbruch et al. | |
| 2010/0162303 A1 | 6/2010 | Cassanova | |
| 2011/0063523 A1 | 3/2011 | Karaoguz et al. | |
| 2011/0066929 A1 | 3/2011 | Karaoguz et al. | |
| 2011/0067062 A1 | 3/2011 | Karaoguz et al. | |
| 2011/0067063 A1 | 3/2011 | Karaoguz et al. | |
| 2011/0067064 A1 | 3/2011 | Karaoguz et al. | |
| 2011/0067069 A1 | 3/2011 | Karaoguz et al. | |
| 2011/0141013 A1 | 6/2011 | Matthews | |
| 2011/0179435 A1 | 7/2011 | Cordray | |
| 2012/0079525 A1 | 3/2012 | Ellis | |

OTHER PUBLICATIONS

Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Office Action from related U.S. Appl. No. 12/881,004 dated Nov. 1, 2012.
Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.

(56) References Cited

OTHER PUBLICATIONS

Final Office Action from related U.S. Appl. No. 12/881,110 dated Oct. 17, 2012.
Office Action from related U.S. Appl. No. 12/850,866 dated Oct. 4, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,154 dated Dec. 5, 2012.
Final Office Action from related U.S. Appl. No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl No. 12/880,888 dated Dec. 6, 2012.
Office Action from related U.S. Appl. No. 12/774,380 dated Jan. 8, 2013.
Final Office Action from related U.S. Appl. No. 12/880,965 dated Jan. 11, 2013.
Final Office Action from related U.S. Appl. No. 12/774,154 dated Apr. 10, 2013.
Final Office Action from related U.S. Appl. No. 12/881,004 dated Mar. 7, 2013.
Final Office Action from related U.S. Appl. No. 12/851,036 dated Feb. 26, 2013.
Final Office Action from related U.S. Appl. No. 12/851,075 dated Mar. 5, 2013.
Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/850,945 dated Apr. 26, 2013.
Non-Final Office Action from related U.S. Appl. No. 12/774,154 dated Aug. 14, 2013.
Non-Final Office Action from related U.S. Appl. No. 12/850,945 dated Aug. 27, 2013.
Non-Final Office Action from related U.S. Appl. No. 12/880,668 dated Jun. 10, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Non-Final Office Action from related U.S. Appl. No. 12/774,221 dated Sep. 20, 2013.
Non-Final Office Action from related U.S. Appl. No. 12/880,749 dated Oct. 4, 2013.

* cited by examiner

SYSTEM AND METHOD FOR GENERATING SCREEN POINTING INFORMATION IN A TELEVISION CONTROL DEVICE

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/774,154, filed concurrently herewith, titled "SYSTEM AND METHOD FOR GENERATING SCREEN POINTING INFORMATION IN A TELEVISION"; and U.S. patent application Ser. No. 12/774,221, filed concurrently herewith, titled "SYSTEM AND METHOD FOR GENERATING TELEVISION SCREEN POINTING INFORMATION USING AN EXTERNAL RECEIVER". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television control devices are incapable of providing pointing information to television program viewers. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method, in a television control device, for generating screen pointing information, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
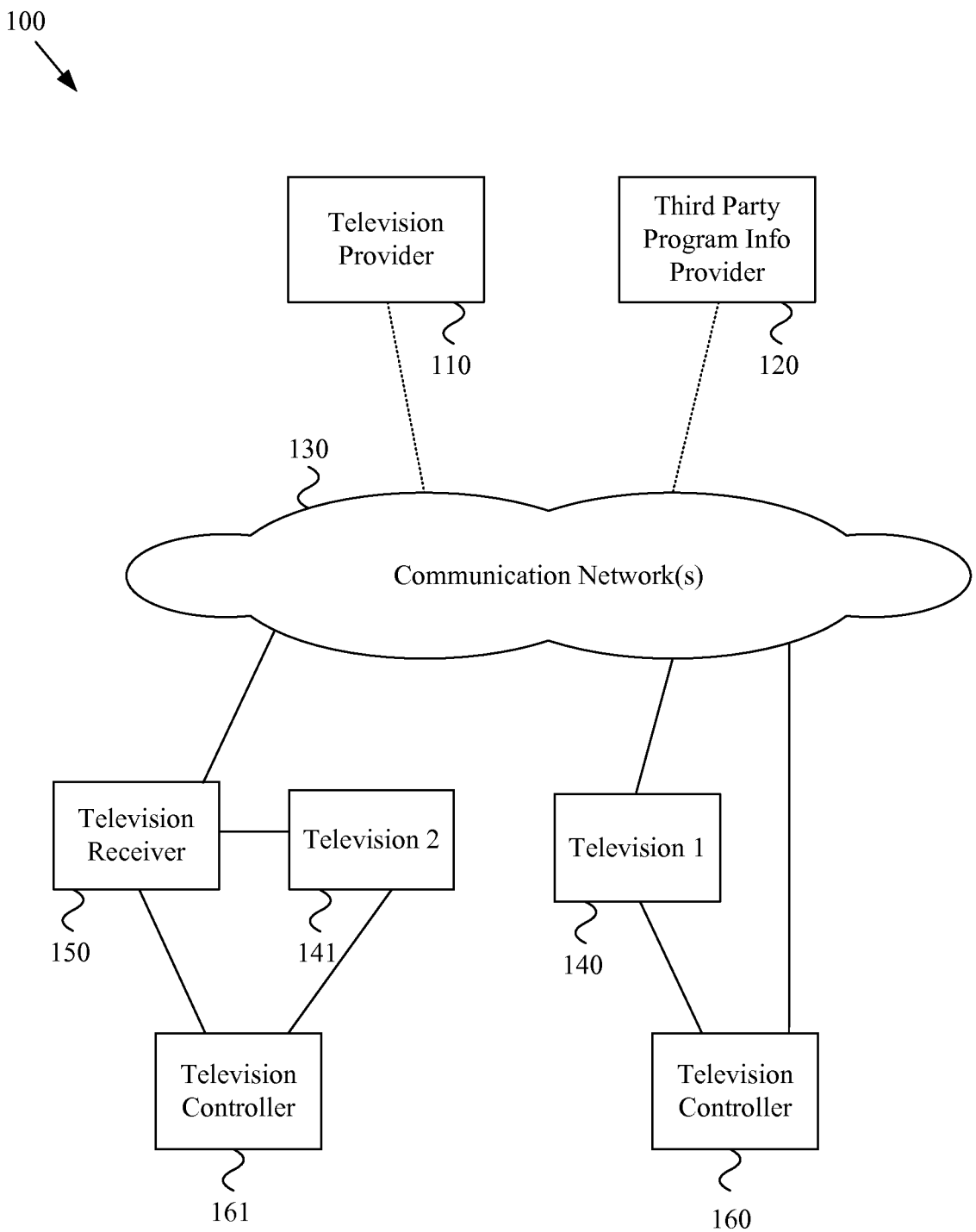
FIG. 1 is a diagram illustrating an exemplary television system in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television control device modules). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion will at times refer to an on-screen pointing location. Such a pointing location refers to a location on the television screen to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing.

Additionally, the following discussion will at times refer to television programming. Such television programming generally includes various types of television programming (e.g., television programs, news programs, sports programs, music television, movies, television series programs and/or associated advertisements, educational programs, live or recorded, broadcast/multicast/unicast, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example, comprise determining an on-screen pointing location during the presentation of television programming on the screen of the television.

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide programming and non-programming information and/or video content. The television provider 110 may, for example, provide information related to a television program (e.g., information describing or otherwise related to selectable objects in programming, etc.).

The exemplary television system 100 may also include a third party program information provider 120. Such a provider may, for example, provide information related to a television program. Such information may, for example, comprise information describing selectable objects in programming, program guide information, etc.

The exemplary television system 100 may include one or more communication networks (e.g., the communication network(s) 130). The exemplary communication network 130 may comprise characteristics of any of a variety of types of communication networks over which video content and/or information related to video content may be communicated. For example and without limitation, the communication network 130 may compare characteristics of a cable television network, a satellite television network, a telecommunication network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.).

The exemplary television system 100 may include a first television controller 160. Such a first television controller 160 may, for example, operate to (e.g., which includes operating when enabled to) control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, etc.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control video content being provided to the first television 140, or to conduct other transactions (e.g., business transactions, etc.).

As will be discussed in more detail later, the first television controller 160 may operate to communicate screen pointing information with the first television 140 and/or other devices. Also, as will be discussed in more detail later, various aspects of the present invention include a user pointing to a location on a television screen (e.g., pointing to an object or person presented in television programming). In such a scenario, the user may perform such pointing in any of a variety of manners. One of such exemplary manners includes pointing with a television control device. The first television controller 160 provides a non-limiting example of a device that a user may utilize to point to an on-screen location. The following discussion of FIGS. 2-10 will present various non-limiting illustrative aspects of such a television controller.

The exemplary television system 100 may also include a television receiver 150. The television receiver may, for example, operate to provide a communication link between a television and/or television controller and a communication network and/or information provider. For example, the television receiver 150 may operate to provide a communication link between the second television 141 and the communication network 130, or between the second television 141 and the television provider 110 (and/or third party program information provider 120) via the communication network 130.

The television receiver 150 may comprise characteristics of any of a variety of types of television receivers. For example and without limitation, the television receiver 150 may comprise characteristics of a cable television receiver, a satellite television receiver, etc. Also for example, the television receiver 150 may comprise a data communication network modem for data network communications (e.g., with the Internet, a LAN, PAN, MAN, telecommunication network, etc.). The television receiver 150 may also, for example, comprise recording capability (e.g., programming recording and playback, etc.).

The exemplary television system 100 may include a second television controller 161. Such a second television controller 161 may, for example, operate to control operation of the second television 141 and the television receiver 150. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, etc.

The second television controller 161 may, for example, transmit signals directly to the second television 141 to control operation of the second television 141. The second television controller 161 may, for example, transmit signals directly to the television receiver 150 to control operation of the television receiver 150. The second television controller 161 may additionally, for example, operate to transmit signals (e.g., via the television receiver 150 and the communication network 130) to the television provider 110 to control video content being provided to the television receiver 150, or to conduct other transactions (e.g., business transactions, etc.).

As will be discussed in more detail later, various aspects of the present invention include a user pointing to a location on a television screen (e.g., pointing to an object or person presented in television programming). In such a scenario, the user may perform such pointing in any of a variety of manners. One of such exemplary manners includes pointing with a television control device. The second television controller 161 provides one non-limiting example of a device that a user may utilize to point to an on-screen location. The following discussion of FIGS. 2-10 will present various non-limiting illustrative aspects of such a television controller.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
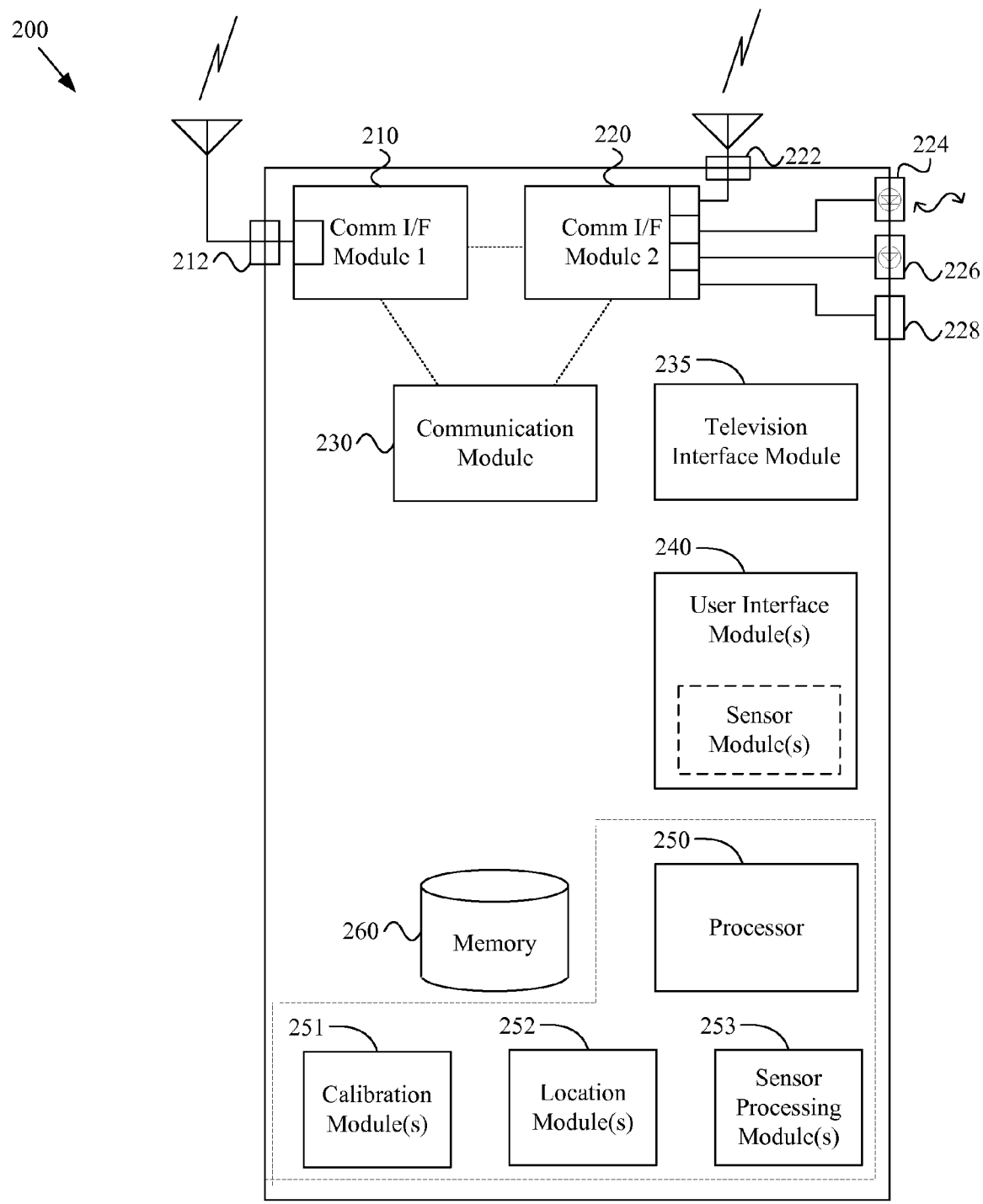
FIG. 2 is a diagram illustrating an exemplary television control device in accordance with various aspects of the present invention.

Turning next to FIG. 2, such figure is a diagram illustrating an exemplary television control device 200 (e.g., a remote control device) in accordance with various aspects of the present invention. The exemplary television control device 200 may, for example, share any or all characteristics with the exemplary television control devices 160, 161 illustrated in FIG. 1 and discussed previously and/or with any of the exemplary television control devices discussed herein.

The exemplary television control device 200 includes a first communication interface module 210. The first communication interface module 210 may, for example, operate to communicate over any of a variety of communication media and utilizing any of a variety of communication protocols. For example, though the first communication interface module 210 is illustrated coupled to a wireless RF antenna via a wireless port 212, the wireless medium is merely illustrative and non-limiting. The first communication interface module 210 may, for example, operate to communicate with one or more communication networks (e.g., cable television networks, satellite television networks, telecommunication networks, the Internet, local area networks, personal area networks, metropolitan area networks, etc.) via which television video content (e.g., television programming), television control information, and/or other data is communicated. Also for example, the first communication module 210 may operate to communicate with local sources of television video content (e.g., video recorders, receivers, gaming devices, etc.). Additionally, for example, the first communication module 210 may operate to communicate with a second television controller (e.g., directly or via one or more intermediate communication networks). Further for example, the first communication module 210 may operate to communicate with a television utilizing any of a variety of television communication connections and/or protocols (e.g., composite video, component video, HDMI, etc.). Still further, for example, the first communication module 210 may operate to communicate with screen pointing sensors.

The exemplary television control device 200 includes a second communication interface module 220. The second communication interface module 220 may, for example, operate to communicate over any of a variety of communication media and utilizing any of a variety of communication protocols. For example, the second communication interface module 220 may communicate via a wireless RF communication port 222 and antenna, or may communicate via a non-tethered optical communication port 224 (e.g., utilizing laser diodes, photodiodes, etc.). Also for example, the second communication interface module 220 may communicate via a tethered optical communication port 226 (e.g., utilizing a fiber optic cable), or may communicate via a wired communication port 228 (e.g., utilizing coaxial cable, twisted pair, HDMI cable, Ethernet cable, any of a variety of wired component and/or composite video connections, etc.). The second communication interface module 220 may, for example, operate to communicate with one or more communication networks (e.g., cable television networks, satellite television networks, telecommunication networks, the Internet, local area networks, personal area networks, metropolitan area networks, etc.) via which television video content, television control information, and/or other data is communicated. Also for example, the second communication module 220 may operate to communicate with local sources of television video content (e.g., video recorders, other receivers, gaming devices, etc.). Additionally, for example, the second communication module 220 may operate to communicate with a second television controller (e.g., directly or via one or more intervening communication networks). Further for example, the second communication module 220 may operate to communicate with a television utilizing any of a variety of television communication connections and/or protocols (e.g., composite video, component video, HDMI, etc.). Still further, for example, the second communication module 220 may operate to communicate with screen pointing sensors.

The exemplary television control device 200 may also comprise additional communication interface modules, which are not illustrated. Such additional communication interface modules may, for example, share any or all aspects with the first 210 and second 220 communication interface modules discussed above.

The exemplary television control device 200 may also comprise a communication module 230. The communication module 230 may, for example, operate to control and/or coordinate operation of the first communication interface module 210 and the second communication interface module 220 (and/or additional communication interface modules as needed). The communication module 230 may, for example, provide a convenient communication interface by which other components of the television control device 200 may utilize the first 210 and second 220 communication interface modules. Additionally, for example, in an exemplary scenario where a plurality of communication interface modules are sharing a medium and/or network, the communication module 230 may coordinate communications to reduce collisions and/or other interference between the communication interface modules 210, 220.

The exemplary television control device 200 may comprise one or more television interface modules 235. The television interface module 235 may, for example, operate to manage communications between the television control device 200 and one or more televisions that are communicatively coupled thereto (e.g., via the first 210 and/or second 220 communication interface modules). For example, the television interface module 235 may operate to communicate general television programming video information to a television (e.g., while the television control device 200 is operating to determine an on-screen pointing location).

Also, for example, as will be discussed in more detail later, the television interface module 235 may output a signal to the television, television receiver or a second television controller or other device with a display, where such signal comprises characteristics adapted to cause the television (or other device) to output a visual indication of on-screen pointing location. Such an indication may, for example, be communicated with (e.g., as a part of) other information (e.g., video information, general device control information, etc.) being communicated to the television (or other device), or such an indication may be communicated to the television (or other device) independent of other information.

The exemplary television control device 200 may additionally comprise one or more user interface modules 240. The user interface module 240 may generally operate to provide user interface functionality to a user of the television control device 200. For example, and without limitation, the user interface module 240 may operate to provide for user control of any or all standard television and/or television receiver commands (e.g., channel control, on/off, television output settings, input selection, etc.). The user interface module 240 may, for example, operate and/or respond to user commands utilizing user interface features disposed on the television receiver (e.g., buttons, touch screen, microphone, etc.) and may also utilize the communication module 230 (and/or first 210 and second 220 communication interface modules) to communicate with a television controller, television receiver, another television control device and/or any other television system component. For example, various user interface features of the television control device 200 may comprise utilization of the television (e.g., utilizing the television screen for menu-driven or other GUI associated with television, television receiver and/or television controller operation).

The user interface module 240 may also operate to interface with and/or control operation of any of a variety of sensors that may be utilized to ascertain an on-screen pointing location. Non-limiting examples of such sensors will be provided later (e.g., in the discussion of FIGS. 3-7 and elsewhere herein). For example and without limitation, the user interface module 240 may operate to receive signals associated with respective sensors (e.g., raw or processed signals directly from the sensors, through intermediate devices (e.g., a television, television control, surround sound system, etc.), via the communication interface modules 210, 220, etc.). Also for example, in scenarios in which such sensors are active sensors (as opposed to purely passive sensors), the user interface module 240 may operate to control the transmission of signals (e.g., RF signals, optical signals, acoustic signals, etc.) from such sensors.

The exemplary television control device 200 may comprise one or more processors 250. The processor 250 may, for example, comprise one or more of a general purpose processor, digital signal processor, application-specific processor, microcontroller, microprocessor, etc. For example, the processor 250 may operate in accordance with software (or firmware) instructions. As mentioned previously, any or all functionality discussed herein may be performed by a processor executing instructions. For example, though various modules are illustrated as separate blocks or modules in FIG. 2 for illustrative clarity, such illustrative modules, or a portion thereof, may be implemented by the processor 250.

The exemplary television control device 200 may comprise one or more memories 260. As discussed above, various aspects may be performed by one or more processors executing instructions. Such instructions may, for example, be stored in the one or more memories 260. Such memory 260 may, for example, comprise characteristics of any of a variety of types of memory. For example and without limitation, such memory 260 may comprise one or more memory chips (e.g., ROM, RAM, EPROM, EEPROM, flash memory, one-time-programmable OTP memory, etc.), hard drive memory, CD memory, DVD memory, etc.

The exemplary television control device 200 may also comprise one or more calibration modules 251 that operate to perform various calibration activities. Examples of such calibration activities will be provided later in this discussion. Briefly, such calibration activities may, for example, comprise interacting with a user and/or user pointing device (e.g., if different from the television control device 200) to determine sensor signals under known circumstances (e.g., determine sensor signals in response to known screen pointing circumstances), and processing such sensor signals to develop algorithms (e.g., transformation matrices, static positional equations, etc.) to determine screen pointing location based on sensor signals received during normal operation. As will also be discussed later, such calibration may also be utilized to establish signal gain (or energy) patterns utilized in determining pointing location.

The exemplary television control device 200 may comprise one or more location-determining modules 252. For example, as will be discussed later, various on-screen pointing location determinations may comprise processing location information. As a non-limiting example, knowing the location of a user (e.g., including the location of a pointing device (e.g., which could be the television control device 200) being utilized by the user) may simplify the solution of various pointing direction determinations. For example, knowing exactly where a pointing device is located (e.g., in three-dimensional space) or where a pointing device is located along a line (e.g., knowing device location in two-dimensional space or land surface coordinates) relative to the television screen (and/or relative to the television control device) may remove a number of unknown variables from applicable positional equations. Note that such positional information may, in various exemplary scenarios, also comprise orientation information for a pointing device (e.g., yaw, pitch and/or roll). Such orientation information may be determined in various manners (e.g., through gyroscopic means, sensor alignment with known references, etc.).

The location-determining module 252 may operate to determine user (or pointing device) location in any of a variety of manners. For example and without limitation, in an exemplary scenario where the pointing device is different from the control device 200, the location-determining module 252 may operate to receive location information from the pointing device (e.g., via one of the communication interface modules 210, 220). For example, such a pointing device may comprise positioning system capability (e.g., global positioning system, assisted GPS, cellular or other triangulation systems, etc.) and communicate information describing the position of the pointing device to the television control device 200. In an exemplary scenario where the television control device 200 is the pointing device, the television control device 200 may comprise on-board position-determining capability.

Also for example, the location-determining module 252 may (e.g., via the user interface modules 240) utilize sensor signals to determine the position (which may include orientation) of the pointing device (or user thereof). For example, signals may arrive at the pointing device at different sensors at different times (or at different phases). Such temporal or phase differences may be processed to determine the location of the pointing device relative to the known location of such sensors. Further for example, the location-determining module 252 may operate to communicate pointing device location information with an external system that operates to determine the location of the pointing device. Such an external system may, for example, comprise a cellular telephony triangulation system, a home or premises-based triangulation system, a global positioning system, an assisted global positioning system, etc. In a non-limiting exemplary scenario where the control device 200 is the pointing device, the location information communicated with the external system may be location information associated with the control device 200.

The exemplary television control device 200 may also comprise one or more sensor processing module(s) 253. As will be explained below, the sensor processing module 253 may operate to receive sensor information (e.g., from the user interface module(s) 240, from the television interface module 235, from the communication interface modules 210, 220, etc.) and process such received sensor information to determine a location on the television screen to which a user is pointing. Various examples of such processing will be provided below. Briefly, such processing may, for example, comprise selecting a sensor with the strongest signal, interpolating between a plurality of sensors, interpolating between a plurality of sensors having strongest signals, determining gain (or energy) pattern intersections, etc. Various aspects of the present invention comprise, for example, determining on-screen pointing location during presentation of television programming (e.g., programming received from a television broadcaster, video recording device, etc.).

Various aspects of the present invention will now be illustrated by way of non-limiting example. Throughout the following discussion, reference will continue to be made to the various modules of the television control device 200 illustrated in FIG. 2. It should be noted that the following non-limiting examples provide specific examples of various aspects, and as such, the scope of various aspects of the present invention should not be limited by characteristics of any of the specific examples, unless specifically claimed.

Figure 3:
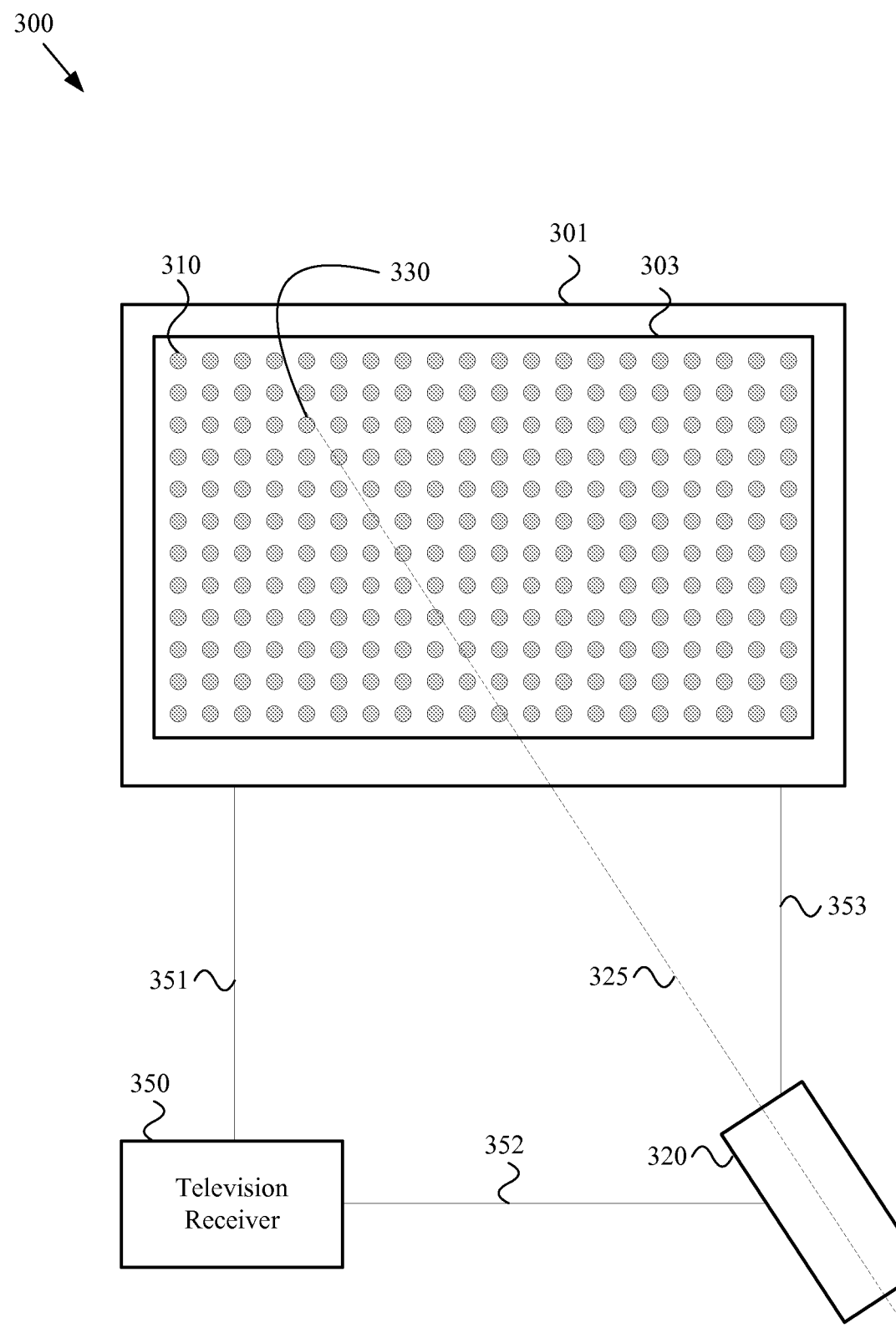
FIG. 3 is a diagram illustrating an exemplary television system with on-screen television sensors in accordance with various aspects of the present invention.

FIG. 3 is a diagram illustrating an exemplary television system 300 with on-screen television sensors in accordance with various aspects of the present invention. The television system 300 includes a television 301 comprising a television screen 303. The television system 300 also includes a television controller 320 (or other pointing device) pointing to an on-screen pointing location 330 along a line 325 between the television controller 320 and the on-screen pointing location 330. The television controller 320 may, for example, share any or all aspects with the exemplary television controllers 160, 161 and 200 discussed previously and with all other television controllers discussed herein. The television control device 320 may, for example, be communicatively coupled directly to the television 301 via a communication link 353. The television control device 320 may also, for example, be communicatively coupled directly to the television receiver 350 via communication link 352. The television control device 320 may additionally, for example, be communicatively coupled indirectly to the television 301 via the television receiver 350 through communication links 351 and 352. Accordingly, various aspects of the television control device 320 will be explained herein with reference to various components of the exemplary television control device 200 illustrated in FIG. 2.

The television system 300 also comprises a television receiver 350 that is communicatively coupled to the television 301 via a communication link 351 (e.g., a two-way communication link providing video information to the television 301 and/or receiving sensor information from the television 301 for communication to the television control device 320). The exemplary television receiver 350 is also communicatively coupled to the television controller 320 via a communication link 352.

The exemplary television screen 303 comprises an array of sensors integrated into the television screen 303. One of such sensors is labeled sensor 310. Any of a variety of sensor types may be utilized, non-limiting examples of which include light sensors or photo detectors (e.g., photo diodes) and RF sensors (e.g., antenna elements or loops).

The array of sensors may be integrated in the television screen 303 in any of a variety of manners, non-limiting examples of which will now be provided. For example, the television screen 303 may comprise an array of liquid crystal display (LCD) pixels for presenting video media to a user. An array of photo diodes and/or antenna elements may be integrated between or behind LCD pixels. For example, every LCD pixel may be associated with a corresponding photo diode and/or antenna element, or every N×M block of LCD pixels may be associated with a corresponding photo diode or antenna element.

As a non-limiting example, an array of photo diodes and/or RF antenna elements may be formed into a substrate beneath or behind transparent LCD substrates. As another example, a photo diode array and/or antenna element array may be interposed between or behind an array of LCD thin film transistors. Also for example, an array of photo diodes and/or RF antenna elements (or other sensors) may be incorporated into a transparent screen overlay. Note that is such an implementation, such transparent screen overlay may be installed after-market. For example, a user that has a television control device 320 with the capability to determine on-screen pointing location may install the transparent screen overlay. In such an exemplary scenario, there may be one or more communication links established between the television control device 320 and the sensors in the overlay, where such communication links may be independent of a communication link over which non-sensor information (e.g., video and/or control information) is communicated between the television 301 and the television control device 320. Such communication link may, for example, be adapted to communicate information from each sensor to the television control device 320 serially (e.g., in a time-multiplexed manner) and/or in parallel.

In a photo detector implementation, passive photo detectors may receive varying amounts of respective light energy depending on the pointing direction of a light source (e.g., a light source of the television control device 320 or other pointing device) aimed at the screen 303. Also for example, received signals (e.g., pulsed signals) may arrive at different sensors at different respective times/phases (e.g., being indicative of relative position and/or pointing direction, which may also be utilized in a pointing determination). In such a photo detector implementation (e.g., utilizing photo diodes), photo detectors may, for example, be tuned to react to particular light frequencies to reduce interference from output pixel light and/or associated reflections, ambient light, etc. As a non-limiting example, photo diodes may be tuned to detect light that is not visible to the human eye, visible light frequencies that are relatively rare, light patterns that are unlikely to occur in a television program (e.g., particular pulse codes), etc.

In an antenna element implementation, an array of antenna elements may be formed on a substrate and placed behind light producing and/or filtering elements in an LCD screen (e.g., so as to avoid interfering with emitted light) or may be formed on a transparent substrate within or in front of the lighted region of the LCD display (e.g., utilizing microscopic antenna elements that are too small to significantly interfere with light emitted from the display). As discussed above, such an implementation may be integrated with the television screen 303, but may also be added as an overlay (e.g., as a production option or an after-market user or technician installation).

In an RF antenna implementation, passive antennas (or elements of an overall antenna matrix) may receive varying respective amounts of RF energy depending on the pointing direction of a directional RF source (e.g., a directional RF source of the television control device 320 or other pointing device) aimed at the screen. Also for example, received signals (e.g., pulsed signals) may arrive at different antennas at different respective times/phases (e.g., being indicative of relative position and/or pointing direction, which may also be utilized in a pointing determination)

In an exemplary scenario, a user may point a pointing device (e.g., a the television control device 320, a laser pointer, directional RF transmitter, specifically designed eyewear, a mobile computing device, a mobile communication device, a gesture tracking device or glove, etc.) at the television screen 303, where the pointing device directs transmitted energy (e.g., light energy, RF energy, acoustic energy, etc.) at a particular location on the television screen 303 to which the pointing device is being pointed. Note that such transmitted energy will likely be transmitted directionally and be associated with an intensity or gain pattern with the highest intensity likely at the center of the pattern (i.e., along the pointing line 325) and decreasing as a function of angle from the center of the pattern (or distance on the screen from the on-screen pointing location).

In such an exemplary scenario, each sensor of the array of sensors integrated into the screen 303 will likely receive some respective amount of energy. For example, the sensor nearest the screen pointing location 330 (i.e., along the pointing line 325) will likely receive the highest amount of energy, sensors adjacent to the screen pointing location 330 will likely receive a next highest range of energy, and sensors away from the pointing location 330 will likely receive progressively less amounts of energy from the pointing device (e.g., the television control device 320) as a function of distance from the pointing location 330, until such energy is lost in the noise floor.

In such an exemplary scenario, the television control device 320 (e.g., the user interface module 240 of the television control device 200 illustrated in FIG. 2) may receive signals indicative of the energy received by the sensors of the sensor array. The television control device 320 may receive such signals in various manners, depending on the degree of integration of such sensors into the television 301. For example, in an exemplary scenario where the sensors are fully integrated into the television screen 303 and operationally integrated into the television 301, the television control device 320 may receive such signals via a communication interface between the television control device 320 and the television 301 (e.g., via communication link 353, or via a communication interface between the television 301 and television control device 320 via the television receiver 350 (e.g., via communication links 351 and 352)). Also for example, in another exemplary scenario where the sensors are overlaid on the television screen 303, and where operation of such sensors is independent of the television 301, the television control device 320 may receive such signals via a communication link directly between the television control device 320 and the sensors, where such a communication link may be independent of other communication links between the television control device 320 and the television 301. Such communication link may, for example, be adapted to communicate information from each sensor to the television control device 320 serially (e.g., in a time-multiplexed manner) and/or in parallel.

The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

For example, the sensor processing module 253 may operate to select the sensor with the highest received energy and determine that the location of such selected sensor is the on-screen pointing location. For example, in an exemplary scenario where the spatial resolution of screen-integrated sensors is relatively fine, such operation may reliably yield a desired level of accuracy without undue processing overhead.

In another example, the sensor processing module 253 may operate to select the sensor with the highest received energy and a plurality of sensors adjacent to such sensor. Then, for example, the sensor processing module 253 may interpolate between the locations of such sensors (e.g., based, at least in part, on weighting). For example, in a first dimension in which a sensor to the right of the highest energy sensor has a higher received energy than a sensor to the left of the highest energy sensor, the sensor processing module 253 may determine that the pointing location is to the right of the highest energy sensor. How much distance to the right may, for example, be determined as a function of the ratio between respective energies received by the right and left sensors. Such calculation may, for example, be a linear or non-linear calculation. Such calculation may also, for example, consider the expected energy pattern of a transmitting pointing device (e.g., in a scenario where energy fall-off is logarithmic as opposed to linear).

In an additional example, the sensor processing module 253 may operate to select all sensors receiving a threshold amount of energy (e.g., an absolute threshold level, a threshold level relative to the highest energy sensor, etc.). Then, for example, the sensor processing module 253 may interpolate between the locations of such sensors (e.g., based, at least in part, on respective energy weighting). For example, the sensor processing module 253 may perform non-linear splining between sensors in a horizontal direction with sensor location on a first axis and sensor energy on a second axis. The sensor processing module 253 may then operate to select the point on the sensor location axis corresponding to the peak sensor energy on the vertical axis. Such splining and selecting may then be repeated in the vertical direction. Alternatively for example, the sensor processing module 253 may operate to perform multi-dimensional splining to create a surface based on sensor energy and select the highest point on such surface and the corresponding screen coordinates of such surface.

In a further example, the sensor processing module 253 may operate to select a first sensor (e.g., the sensor with the highest received energy). Then, for example, the sensor processing module 253 may utilize information of the relative distance between the selected sensor and the pointing device (e.g., the television control device 320), information of the gain pattern for the signal transmitted from the pointing device to the selected sensor, and calibration information to determine where the pointing device may be pointed in order for the sensor to receive such energy. For example, this may result in a first closed figure (e.g., a circle, cloverleaf, etc.) drawn around the sensor on the screen plane. Then the sensor processing module 253 may repeat the procedure for a second sensor (e.g., a sensor with the second highest received energy), resulting in a second closed figure. The sensor processing module 253 may then, for example, determine the point(s) of intersection between the first and second figures. If only one point of intersection lies within the border of the screen, then such point of intersection might be utilized as an estimate of the pointing location. If, however, there are two potentially significant points of intersection (or more depending on the figures), then the sensor processing module 253 may repeat the procedure for a third sensor (e.g., the sensor with the third highest energy, a sensor generally along the line perpendicular to a line segment between the first and second sensors, etc.) and determine a point nearest the intersection of the first, second and third closed figures. Such a point of intersection may then be utilized as an estimate of the pointing location.

The above-mentioned examples of screen-integrated sensors and related pointing location determinations were presented as exemplary illustrations. Though the above-mentioned examples generally discuss light and/or RF energy sensors, other types of sensors may also be integrated into a television screen or overlaid thereon. For example and without limitation, the sensors may comprise acoustic sensors that operate to sense acoustic energy (e.g., directed acoustic energy directed to a pointing location on the screen). For example, such directed acoustic energy may be formed at frequencies beyond the range of human hearing (e.g., and at frequencies beyond the range of pet hearing as well).

Also note that various energy radiation patterns may be used, and/or a plurality of energy radiation patterns may be used. For example, though (e.g., for illustrative clarity) the discussion herein generally discusses a single energy emission from the pointing device, a plurality of energy emissions may be utilized. For example and without limitation, a pointing device (e.g., the television control device 320) may transmit a plurality of different directed energy emissions (e.g., light, RF, etc.) toward the pointing direction. Also for example, a pointing device may transmit one or more energy emissions that move relative to the pointing direction (e.g., in a raster pattern or any other pattern).

After determining on-screen pointing location, the television control device 320 may communicate information of such determined location in various manners. For example and without limitation, the sensor processing module 253 of the television control device 200 may utilize the television interface module 235 to communicate information of such on-screen pointing location to the television 301 for presentation to the user. Also for example, the sensor processing module 253 may utilize the user interface module 240 to communicate information of such on-screen pointing location to the user (e.g., on a display of the television control device 200). Such communication will also be addressed in the discussions of FIGS. 9-10.

Figure 4:
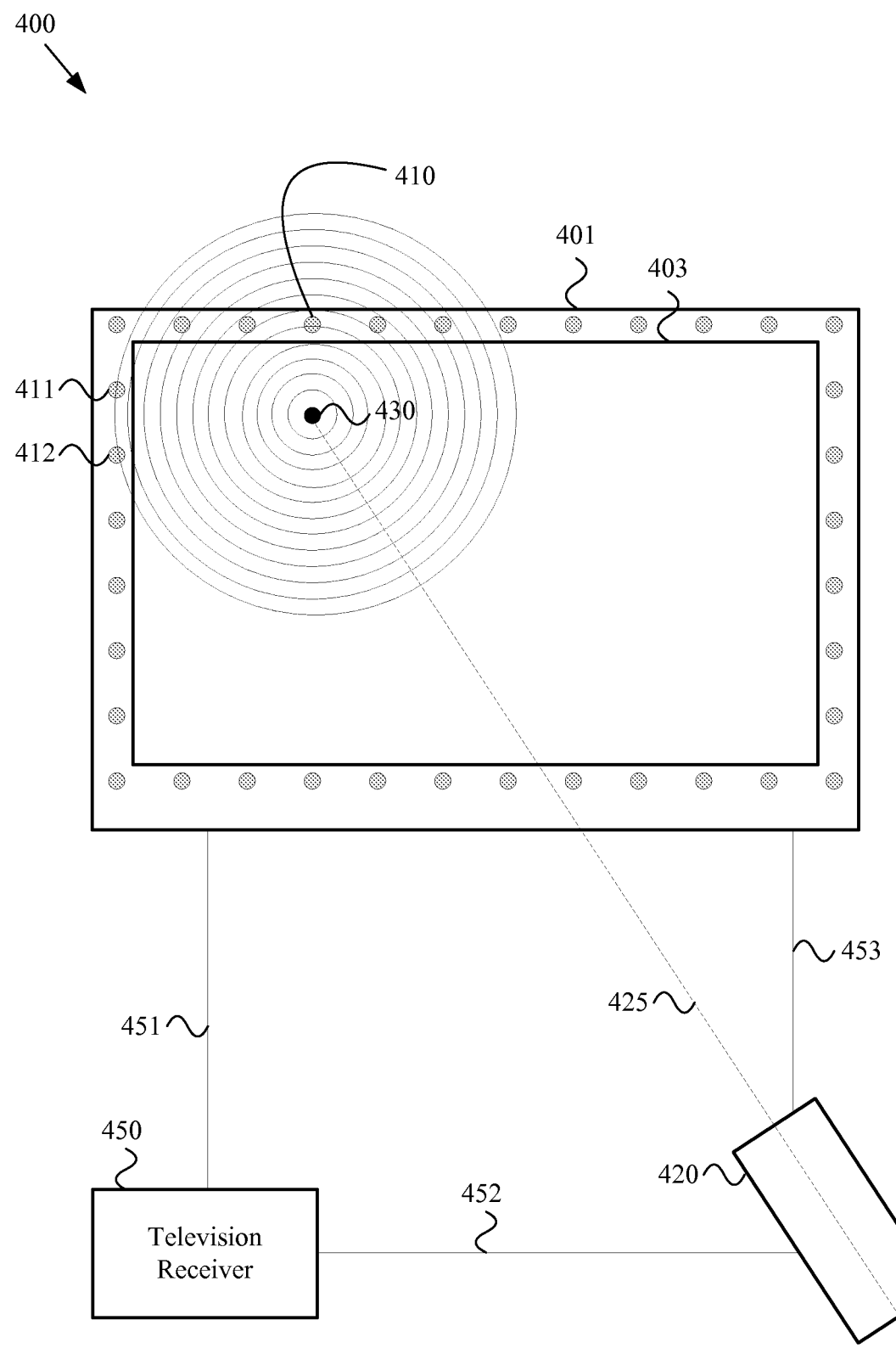
FIG. 4 is a diagram illustrating an exemplary television system with off-screen television sensors in accordance with various aspects of the present invention.

In addition to various television configurations in which sensors are integrated into the television screen, sensors may be incorporated into the television off-screen. Such sensors may, for example, be incorporated in a border around the screen (or overlaid thereon). For example and without limitation, FIG. 4 is a diagram illustrating an exemplary television system 400 with off-screen television sensors in accordance with various aspects of the present invention. The television system 400 includes a television 401 comprising a television screen 403. The television system 400 also includes a television controller 420 (or other pointing device) pointing to an on-screen pointing location 430 along a pointing line 425 between the television controller 420 and the on-screen pointing location 430. The television controller 420 may, for example, share any or all aspects with the exemplary television controllers 160, 161, 200 and 320 discussed previously and with all other television controllers discussed herein. The television control device 420 may, for example, be communicatively coupled directly to the television 401 via a communication link 453. The television control device 420 may also, for example, be communicatively coupled directly to the television receiver 450 via communication link 452. The television control device 420 may additionally, for example, be communicatively coupled indirectly to the television 401 via the television receiver 450 through communication links 451 and 452. Accordingly, various aspects of the television control device 420 will be explained herein with reference to various components of the exemplary television control device 200 illustrated in FIG. 2.

The television system 400 also comprises a television receiver 450 that is communicatively coupled to the television 401 via a communication link 451 (e.g., a two-way communication link providing video information to the television 401 and/or receiving sensor information from the television 401 for communication to the television control device 420). The exemplary television receiver 450 is also communicatively coupled to the television controller 420 via a communication link 452.

The exemplary television 401 comprises an array of sensors integrated into the television 401 around the border of the screen 403. Three of such sensors are labeled 410, 411 and 412. As discussed above, any of a variety of sensor types may be utilized, non-limiting examples of which include light sensors or photo detectors (e.g., photo diodes), RF sensors (e.g., antenna elements), acoustic sensors (e.g., microphones), etc.

The array of sensors may be integrated around the television screen 403 in any of a variety of manners. For example, such sensors may be integrated in a border of the television screen 403 that is not used for outputting video content. Such a configuration may, for example, avoid sensor interference with video content being displayed on the screen. Also for example, as illustrated in FIG. 4, such sensors may be mounted to a border material of the television 401.

For example, an array of photo detectors (e.g., photo diodes) and/or antenna elements (e.g., individual antennas or elements of an antenna array, for example, a phased array) may be incorporated into a border of the television 401 around the screen 403. For example, every screen pixel row and/or column may be associated with a pair of corresponding photo diodes and/or antenna elements, or every N×M block of screen pixels may be associated with one or more corresponding photo diodes or antenna elements (e.g., a row and column sensor, two row and two column elements, etc.).

In a photo detector implementation, passive photo detectors may receive varying amounts of respective light energy depending on the pointing direction of a light source (e.g., a directional light source of the television control device 420) pointed at the screen. Also for example, received signals (e.g., pulsed signals) may arrive at different sensors at different respective times/phases (e.g., being indicative of relative position and/or pointing direction, which may also be utilized in a pointing determination). In such a photo detector implementation (e.g., utilizing photo diodes), photo detectors may, for example, be tuned to react to particular light frequencies to reduce interference from output pixel light and/or associated reflections. As a non-limiting example, photo diodes may be tuned to detect light that is not visible to the human eye, visible light frequencies that are relatively rare, light patterns that are unlikely to occur in a television program (e.g., particular pulse codes), etc. In one example, the photo detectors integrated with the television body off-screen may comprise photo diodes that operate to detect energy from a laser pointer or directed infrared energy from a television controller or other pointing device. Note that analogously to the on-screen sensors discussed previously, various aspects may comprise mounting (e.g., adhering) sensors to the television body off-screen. Such sensor installation may, for example, occur at the factory or after-market by a technician or user.

In an antenna element implementation, an array of antenna elements may be positioned around the border of the screen 403. In an RF antenna implementation, passive antennas (or elements of an overall antenna matrix) may receive varying amounts of respective RF energy depending on the pointing direction of a directional RF source aimed at the screen. Also for example, received signals (e.g., pulsed signals) may arrive at different antennas at different respective times/phases (e.g., being indicative of relative position and/or pointing direction, which may also be utilized in a pointing determination). Note that analogously to the on-screen sensors discussed previously, various aspects may comprise mounting (e.g., adhering) sensors to the television body off-screen. Such sensor installation may, for example, occur at the factory or after-market by a technician or user.

In an exemplary scenario, a user may point a pointing device (e.g., a remote controller 420, a laser pointer, directional RF transmitter, specifically designed eyewear, a mobile computing device, a mobile communication device, a gesture tracking device or glove, etc.) at the television screen 403, where the pointing device directs transmitted energy (e.g., light and/or RF energy and/or acoustic energy) at a particular location on the television screen 403 to which the device is being pointed. Note that such transmitted energy will likely be transmitted directionally and be associated with an intensity or gain pattern with the highest intensity likely at the center of the pattern (i.e., along the pointing line 425) and decreasing as a function of angle from the center of the pattern. Such a gain pattern is generally represented in FIG. 4 by the concentric circles around the on-screen pointing location 430. Note, however, that in practice such a gain pattern is likely to be more complex than the illustrated pattern (e.g., including lobes with respective peaks and nulls).

In such an exemplary scenario, each sensor of the sensors integrated into the television 401 around the border of the screen 403 will likely receive some respective amount of energy. For example, along a particular axis, the sensor nearest the screen pointing location 430 (i.e., along the pointing line 425) will likely receive the highest amount of energy, sensors along the particular axis adjacent to the screen pointing location 430 will likely receive a next highest range of energy, and sensors away from the pointing location 430 will likely receive progressively less amounts of energy from the pointing device (e.g., the television control device 420), as a function of distance from the pointing location 430 or as a function of the angular displacement from the pointing line 425, until such energy is lost in the noise floor.

For example, along the horizontal axis, sensor 410 is closest to the pointing location 430 and will likely receive the highest energy, with sensors adjacent to the left and right of sensor 410 receiving the next highest amounts of energy, and so on. Also, along the vertical axis, sensors 411 and 412 will likely receive close to the highest amount of energy, with sensors above and below such sensors 411, 412 receiving the next highest amounts of energy and so on.

In such an exemplary scenario, the television control device 420 (e.g., the user interface module 240 of the television control device 200 illustrated in FIG. 2) may receive signals indicative of the energy received by the sensors of the television 401. The television control device 420 may receive such signals in various manners, depending on the degree of integration of such sensors into the television 401. For example, in an exemplary scenario where the sensors are fully integrated into the television 401 (e.g., into a border around the screen 403) and operationally integrated into the television 401, the television control device 420 may receive such signals via a communication interface between the television control device 420 and the television 401 (e.g., via communication link 453 or via a communication interface between the television 401 and the television control device 420 via the television receiver 450 (e.g., via communication links 451 and 452)). Also for example, in another exemplary scenario where the sensors are overlaid on (e.g., adhered to) the television screen 401, and where operation of such sensors is independent of the television 401, the television control device 420 may receive such signals via a communication link directly between the television control device 420 and the sensors, where such a communication link may be independent of other communication links between the television control device 420 and the television 401. Such communication link(s) may, for example, be adapted to communicate information from each sensor to the television control device 420 serially (e.g., in a time-multiplexed manner) and/or in parallel.

The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

For example, the sensor processing module 253 may operate to select the sensor with the highest received energy along each of the horizontal and vertical axes and determine that the respective locations of such selected sensors correspond to the horizontal and vertical coordinates of the on-screen pointing location. For example, in an exemplary scenario where the spatial resolution of screen border sensors is relatively fine, such operation may reliably yield a desired level of accuracy without undue processing overhead. For example, the sensor processing module 253 may determine that sensors 410 and 411 have the highest received energy for the horizontal and vertical axes, respectively, and thus determine that the on-screen pointing location is represented in the horizontal axis by the horizontal location of the sensor 410 and represented in the vertical axis by the vertical location of the sensor 411. Note that in scenarios where two sensors have relatively similar energy levels (e.g., as might occur at sensors 411 and 412), the sensor processing module 253 may select a midpoint between such sensors (e.g., the vertical midpoint between sensors 411 and 412).

In another example, the sensor processing module 253 may operate to select, for each screen axis, the sensor with the highest received energy and a plurality of sensors adjacent to such sensor. Then, for example, the sensor processing module 253 may interpolate between the locations of such sensors (e.g., based, at least in part, on weighting). For example, in the horizontal dimension in which a sensor to the right of the highest energy sensor 410 has a higher received energy than a sensor to the left of the highest energy sensor 410, the sensor processing module 253 may determine that the pointing location along the horizontal axis is to the right of the highest energy sensor 410. How much distance to the right may, for example, be determined as a function of the ratio between respective energies received by the right and left sensors. Such calculation may, for example, be a linear or non-linear calculation. Such calculation may also, for example, consider the expected energy pattern of a transmitting pointing device (e.g., in a scenario where energy fall-off is logarithmic as opposed to linear). The sensor processing module 253 may then, for example, repeat such operation in the vertical direction.

In another example, the sensor processing module 253 may operate to select all sensors in each of the axes receiving a threshold amount of energy (e.g., an absolute threshold level, a threshold level relative to the highest energy sensor, etc.). Then, for example, the sensor processing module 253 may interpolate between the locations of such sensors (e.g., based, at least in part, on respective energy weighting). For example, the sensor processing module 253 may perform non-linear splining between sensors in a horizontal direction with sensor location on a first axis and sensor energy on a second axis. The sensor processing module 253 may then operate to select the point on the sensor location axis corresponding to the peak sensor energy on the vertical axis. Such splining and selecting may then be repeated in the vertical screen direction. Alternatively for example, the sensor processing module 253 may operate to perform multi-dimensional splining to create a surface based on sensor energy and select the highest point on such surface and the corresponding screen coordinates of such surface.

After determining on-screen pointing location, the television control device 420 may communicate information of such determined location in various manners. For example and without limitation, the sensor processing module 253 of the television control device 200 may utilize the television interface module 235 to communicate information of such on-screen pointing location to the television 401 for presentation to the user. Also for example, the sensor processing module 253 may utilize the user interface module 240 to communicate information of such on-screen pointing location to the user (e.g., on a display of the television control device 200). Such communication will also be addressed in the discussions of FIGS. 9-10.

Figure 5:
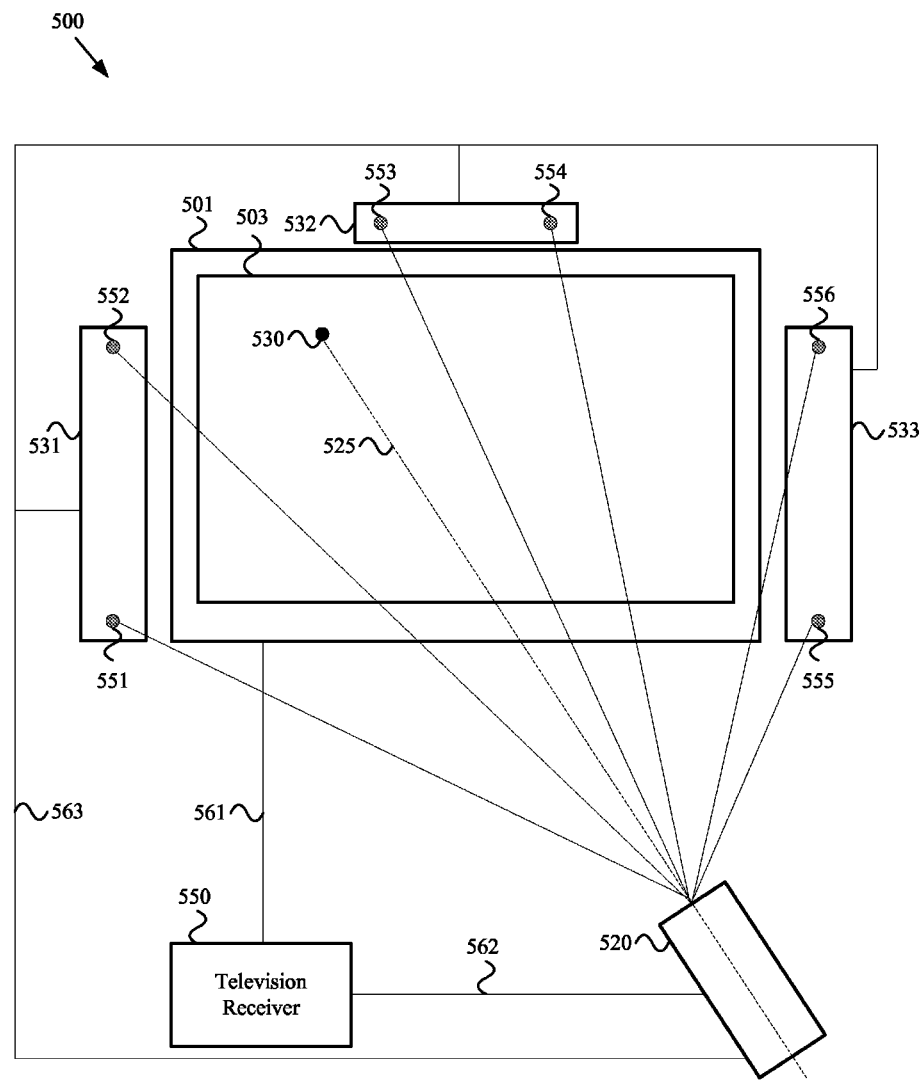
FIG. 5 is a diagram illustrating an exemplary television system with off-television sensors in accordance with various aspects of the present invention.

In addition to various television configurations in which sensors are integrated into the television off-screen or off the video presentation portion of the screen, sensors may be incorporated into the television system off-television. Such sensors may, for example, be incorporated in other components of a television system besides the television. For example and without limitation, FIG. 5 is a diagram illustrating an exemplary television system 500 with off-television sensors in accordance with various aspects of the present invention. The television system 500 includes a television 501 comprising a television screen 503. The television system 500 also includes a television controller 520 (or other pointing device) pointing to an on-screen pointing location 530 along a pointing line 525 between the television controller 520 and the on-screen pointing location 530. The television controller 520 may, for example, share any or all aspects with the exemplary television controllers 160, 161, 200, 320 and 420 discussed previously and with all other television controllers discussed herein. Accordingly, various aspects of the television control device 520 will be explained herein with reference to various components of the exemplary television control device 200 illustrated in FIG. 2. The television control device 520 may, for example, be communicatively coupled directly to the television 501 via a communication link (not illustrated). The television control device 520 may also, for example, be communicatively coupled directly to the television receiver 550 via communication link 562. The television control device 520 may additionally, for example, be communicatively coupled indirectly to the television 501 via the television receiver 550 through communication links 561 and 562. Accordingly, various aspects of the television control device 520 will be explained herein with reference to various components of the exemplary television control device 200 illustrated in FIG. 2.

The television system 500 also comprises a television receiver 550 that is communicatively coupled to the television 501 via a communication link 561 (e.g., a two-way communication link providing video information to the television 501 and/or receiving sensor information from the television 501 for communication to the television control device 520).

The television control device 520 is illustrated with one or more communication links 563 to the various sensors 551-556 independent of other communication links (e.g., links to the television 501, links to the television receiver 550, etc.). Note that in various exemplary scenarios, the television control device 520 (e.g., a user interface module 240) may receive sensor information from the television 501 via a television communication link (not illustrated), via a communication link 562 with the television receiver 550 and/or via the independent communication link(s) 563. The exemplary television control device 520 may also be communicatively coupled to other pointing devices and/or television control devices.

The exemplary television system 500 comprises an array of sensors integrated into audio speaker components (e.g., surround sound speakers) positioned around the television 501. For example, the television system 500 comprises a left speaker 531 comprising a top sensor 552 and a bottom sensor 551. Also for example, the television system 500 comprises a right speaker 533 comprising a top sensor 556 and a bottom sensor 555. Additionally for example, the television system 500 comprises a center speaker 532 comprising a left sensor 553 and a right sensor 554. As discussed above, any of a variety of sensor types may be utilized, non-limiting examples of which include light sensors or photo detectors (e.g., photo diodes), RF sensors (e.g., antenna elements), acoustic sensors (e.g., microphones), etc. Note that the audio speaker component example discussed herein is merely illustrative and that such sensors may be installed in any of a variety of locations (e.g., dedicated sensor boxes, attached to furniture, etc.).

The array of sensors may be positioned around the television 501 in any of a variety of manners. For example, such sensors may be positioned around the television 501 generally in the same plane as the television screen 503. In such an exemplary scenario, on-screen pointing location may be determined in a manner similar to the interpolation and/or gain pattern intersection discussed above with regard to off-screen and/or on-screen sensors. Note that since the locations of the sensors are likely to be inconsistent between various television system configurations, a calibration procedure may be implemented (e.g., by the calibration module 251). Such calibration will be discussed in more detail below.

In an exemplary configuration, one or more photo detectors (e.g., photo diodes) and/or antenna elements (e.g., individual antennas or elements of an antenna array) may be incorporated into a plurality of respective surround sound speakers positioned around the television 501.

For example, in a photo detector implementation, passive photo detectors may receive varying amounts of respective light energy depending on the pointing direction of a light source (e.g., a directional light source of the television control device 520) aimed at the screen. As discussed previously, directed energy (e.g., light, RF, acoustic, etc.) may be transmitted in a pattern (or envelope), so even if a pointing device (e.g., the television control device 520) is pointed to a location on the television screen 530 along pointing line 525, sensors off-screen (or even off-television) may still receive energy from the transmission (albeit likely not with the same intensity at which energy is delivered along the pointing line 525). Also for example, received signals (e.g., pulsed signals) may arrive at different sensors at different respective times/phases (e.g., being indicative of relative position and/or pointing direction, which may also be utilized in a pointing determination).

In a photo detector implementation (e.g., utilizing photo diodes), photo diodes may, for example, be tuned to react to particular light frequencies to reduce interference from output pixel light and/or associated reflections, ambient light, room lighting, etc. As a non-limiting example, photo diodes may be tuned to detect light that is not visible to the human eye, visible light frequencies that are relatively rare, light patterns that are unlikely to occur in a television program (e.g., particular pulse codes), etc. In one example, the photo detectors integrated with off-television components may comprise photo diodes that operate to detect energy from a laser pointer or directed infrared energy from a television controller (or other pointing device). Note that analogously to the on-screen sensors discussed previously, various aspects may comprise mounting (e.g., adhering) sensors to various off-television components. Such sensor installation may, for example, occur at the factory or after-market by a technician or user.

In an antenna element implementation, an array of antenna elements may be positioned around off-television components (e.g., in surround sound components). In an RF antenna implementation, passive antennas (or elements of an overall antenna matrix) may receive varying amounts of respective RF energy depending on the pointing direction of a directional RF source (e.g., a directional RF source of the television controller 520) pointed at a location on the screen. Also for example, received signals (e.g., pulsed signals) may arrive at different antennas at different respective times/phases (e.g., being indicative of relative position and/or pointing direction, which may also be utilized in a pointing determination). Note that analogously to the on-screen sensors discussed previously, various aspects may comprise mounting (e.g., adhering) sensors to the off-television components. Such sensor installation may, for example, occur at the factory or after-market by a technician or user.

In an exemplary scenario, a user may point a pointing device (e.g., a television controller 520 (e.g., a remote control device), a laser pointer, directional RF transmitter, specifically designed eyewear, a mobile computing device, a mobile communication device, a gesture tracking device or glove, etc.) at the television screen 503, where the pointing device directs transmitted energy (e.g., light and/or RF energy and/or acoustic energy) at a particular location on the television screen 503 to which the user is pointing with the pointing device. Note that such transmitted energy will likely be transmitted directionally and be associated with an intensity or gain pattern with the highest intensity at the center of the pattern (i.e., along the pointing line 525) and decreasing as a function of angle from the center of the pattern (or distance from the center point). Such a gain pattern was discussed previously in the discussion of FIG. 4.

In such an exemplary scenario, each sensor of the sensors integrated into the television system 500 off-television will likely receive some respective amount of energy. For example, along a particular axis, the sensor nearest to the screen pointing location 530 (i.e., along the pointing line 525) will likely receive the highest amount of energy, a sensor next nearest to the screen pointing location 530 will likely receive a next highest range of energy, and sensors away from the pointing location 530 will likely receive progressively less amounts of energy from the pointing device (e.g., the television control device 420), as a function of distance from the pointing location 530 and/or angle off the pointing line 525 (e.g., until such energy is lost in the noise floor). For example, sensor 553 is nearest to the pointing location 530 and will likely receive the highest energy, sensor 552 is next nearest to the pointing location 530 and will likely receive the next highest energy, and so on.

Note that in the implementation illustrated in FIG. 5, in particular since there are a relatively low number of sensors, signals from a same sensor may be utilized in determining multiple axes of pointing location. As mentioned previously, a calibration procedure may be performed when the system 500 is configured to assist in such pointing determination.

In an exemplary scenario, the television control device 520 (e.g., the user interface module 240 of the television control device 200 illustrated in FIG. 2) may receive signals indicative of the energy received by the sensors of the television system 500. The television control device 520 may receive such signals in various manners, depending on the degree of integration of such sensors into the television 501. For example, in an exemplary scenario where the sensors are fully integrated into the television system 500 components (e.g., surround sound speaker components 531-533) and operationally integrated into such components, the television control device 520 may receive such signals via a communication interface between the television control device 520 and the respective off-television components (e.g., via a communication link 563 between the television control device 520 and the surround sound speaker components 531-533). Also for example, in another exemplary scenario where the sensors are overlaid on (e.g., adhered to) the off-television components, and where operation of such sensors is independent of the television 501, the television control device 520 may receive such signals via a communication link directly between the television control device 520 and the individual sensors (e.g., communication link 563), where such a communication link may be independent of other communication links between the television control device 520 and the television 501 and/or independent of other communication links between the television control device 520 and other television system 500 components (e.g., television receiver 550 and the surround sound speaker components 531-533).

The user interface module 240 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

In an exemplary scenario, the sensor processing module 253 may operate to estimate a position between sensor positions based on relative sensor energy. For example, in the horizontal dimension, sensor 552 may correspond to a relatively high amount of energy, and sensor 556 may correspond to a relatively low amount of received energy. The sensor processing module 253 may, for example, estimate a horizontal position relatively closer to sensor 552 by an amount proportional to the relative difference between respective amounts of energy. The sensor processing module 253 may perform a similar estimation utilizing sensors 551 and 555. Various horizontal position estimations may then be averaged. Alternatively for example, respective energies for the left speaker 531 sensors may be averaged, respective energies for the right speaker 533 sensors may be averaged, and such left and right speaker average energies may then be utilized to determine a horizontal pointing location. The sensor processing module 253 may then, for example, perform a similar pointing direction estimate in the vertical direction.

In another exemplary scenario, a calibration procedure may be performed to determine an expected sensor energy level (e.g., absolute or relative) when the user is pointing at the sensor. In such a scenario, combined with a gain pattern and user (or pointing device) location relative to the television 501, a first line (e.g., a circle or arc) may be drawn around a first sensor 552. Similarly, a second line (e.g., a circle or arc) may be drawn around a second sensor 553, and the intersection of the first and second lines utilized as an estimate of a pointing location. Additional lines associated with other sensors may also be utilized. Such additional lines may, for example, be utilized when selecting between multiple line intersections and/or for greater accuracy or resolution. Note that such line intersection solution may be applied to any of the previously discussed scenarios (e.g., as illustrated in FIGS. 3-4). A non-limiting example of this was presented in the discussion of FIG. 3, and another example will be provided in the following discussion of FIG. 7.

After determining on-screen pointing location, the television control device 520 may communicate information of such determined location in various manners. For example and without limitation, the sensor processing module 253 of the television control device 200 may utilize the television interface module 235 to communicate information of such on-screen pointing location to the television 501 for presentation to the user. Also for example, the sensor processing module 253 may utilize the user interface module 240 to communicate information of such on-screen pointing location to the user (e.g., on a display of the television control device 200). Such communication will also be addressed in the discussions of FIGS. 9-10.

Figure 6:
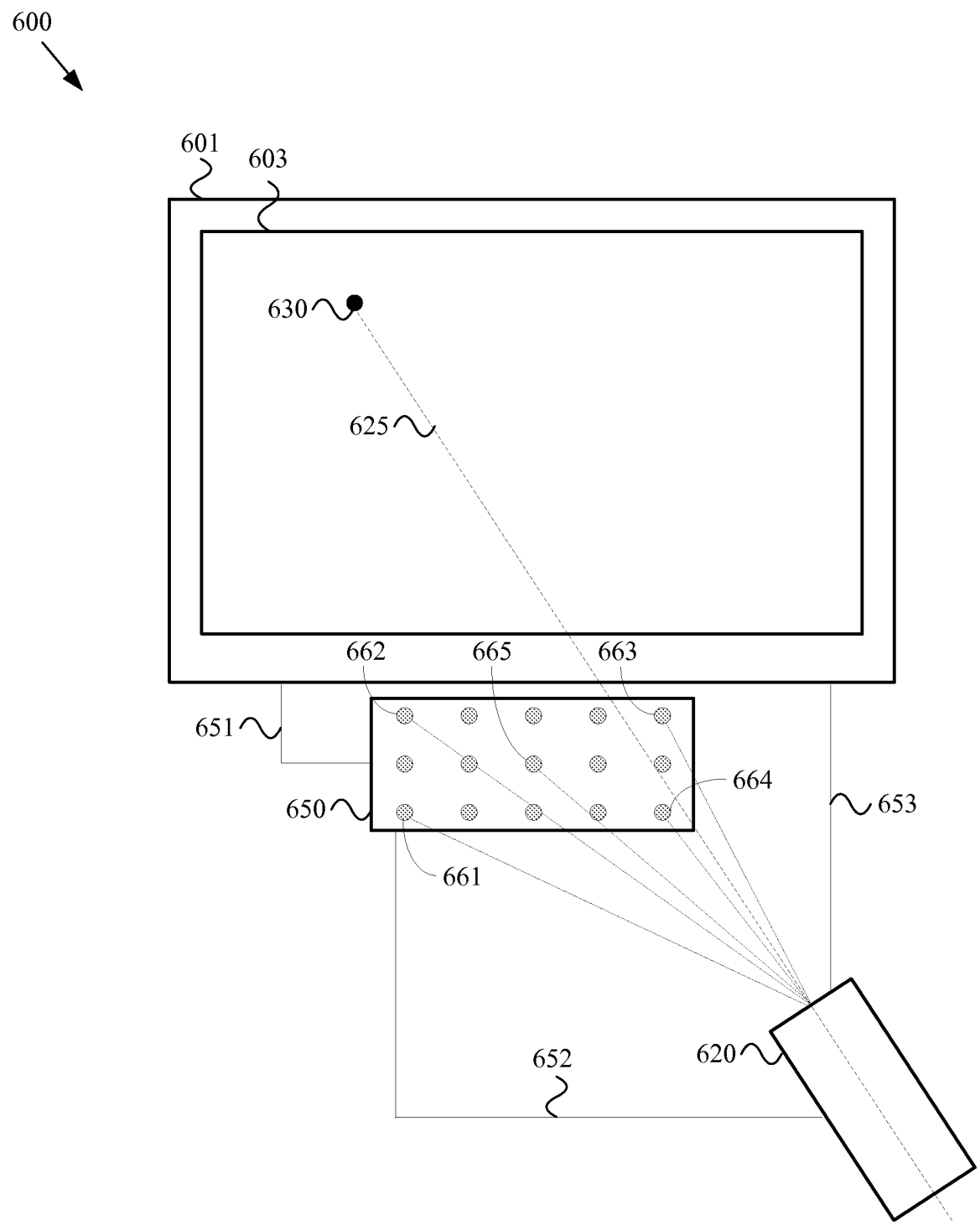
FIG. 6 is a diagram illustrating an exemplary television system with television receiver sensors in accordance with various aspects of the present invention.

As discussed above, pointing sensors may be incorporated into the television system off-television (i.e., placed separately in stand-alone housings, integrated with other apparatus, attached to other apparatus, etc.). Another example of such off-television sensor placement is presented in FIG. 6. In particular, the screen pointing sensors may be integrated into the television receiver. FIG. 6 is a diagram illustrating an exemplary television system 600 with television receiver sensors in accordance with various aspects of the present invention.

The television system 600 includes a television 601 comprising a television screen 603. The television system 600 also includes a television controller 620 (or other pointing device) pointing to an on-screen pointing location 630 along a pointing line 625 between the television controller 620 and the on-screen pointing location 630. The television controller 620 may, for example, share any or all aspects with the exemplary television controllers 160, 161, 200, 320, 420 and 520 discussed previously and with all other television controllers discussed herein. Accordingly, various aspects of the television control device 620 will be explained herein with reference to various components of the exemplary television control device 200 illustrated in FIG. 2. The television control device 620 may, for example, be communicatively coupled directly to the television 601 via a communication link (not illustrated). The television control device 620 may also, for example, be communicatively coupled directly to the television receiver 650 via communication link 653. The television control device 620 may additionally, for example, be communicatively coupled indirectly to the television 601 via the television receiver 650 through communication links 651 and 652. Accordingly, various aspects of the television control device 620 will be explained herein with reference to various components of the exemplary television control device 200 illustrated in FIG. 2.

The television system 600 also comprises a television receiver 650 that is communicatively coupled to the television 601 via a communication link 651 (e.g., a two-way communication link providing video information to the television 601 and/or communicating sensor information and/or screen pointing information with the television 601). The television receiver 650 comprises an array of screen pointing sensors. A portion of the sensors are labeled (661-665) for discussion purposes. Note that such sensors may be arranged in any of a variety of configurations (e.g., matrix configuration, border configuration, placed only at the front corners, etc.). The pointing sensors may, for example, be integrated into the television receiver 650 and/or attached to the television receiver 650 in any of a variety of manners (e.g., in any manner similar to those discussed previously with regard to the televisions and/or television system components discussed previously).

Note that in various exemplary scenarios, the television control device 620 (e.g., a user interface module 240) may receive additional sensor information from other sensors via the television communication line 653 and/or other communication links. The exemplary television control device 620 is also communicatively coupled to the television receiver 650 via a communication link 652.

The exemplary television receiver 650 comprises an array of sensors integrated into the television receiver 650. For example, the television receiver 650 comprises a lower left sensor 661, upper left sensor 662, upper right sensor 663, lower right sensor 664 and center sensor 665. As discussed above, any of a variety of sensor types may be utilized, non-limiting examples of which include light sensors or photo detectors (e.g., photo diodes), RF sensors (e.g., antenna elements), acoustic sensors (e.g., microphones), etc.

The exemplary television receiver 650 may be positioned around the television 601 in any of a variety of manners. For example, the television receiver 650 (and thus the sensors) may be positioned around the television 601 in an orientation such that the front face of the television receiver 650 (and thus the sensors) is generally in the same plane as the television screen 603. Such placement is not necessary, but may be advantageous from an accuracy perspective. In such an exemplary scenario, on-screen pointing location may be determined in a manner similar to the interpolation and/or gain pattern intersection discussed above with regard to off-screen and/or on-screen sensors. Note that since the locations of the sensors are likely to be inconsistent between various television system configurations (i.e., it is unlikely that every user will place/position the television receiver 650 in the same manner), a calibration procedure may be implemented (e.g., by the calibration module 251). Such calibration was discussed previously and will also be revisited below.

In an exemplary configuration, one or more photo detectors (e.g., photo diodes) and/or antenna elements (e.g., individual antennas or elements of an antenna array) may be incorporated into the faceplate of the television receiver 650. Note that additional sensors positioned away from the television receiver 650 may also be utilized (e.g., any of the previously discussed sensor placements).

For example, in a photo detector implementation, passive photo detectors may receive varying amounts of respective light energy depending on the pointing direction of a light source (e.g., a directional light source of the television control device 620) aimed at the screen. As discussed previously, directed energy (e.g., light, RF, acoustic, etc.) may be transmitted in a pattern (or envelope), so even if a pointing device is pointed to a location on the television screen 630 along pointing line 625, sensors off-screen (e.g., sensors integrated into the television receiver 650) may still receive energy from the transmission (albeit likely not with the same intensity at which energy is delivered along the pointing line 625). Also for example, received signals (e.g., pulsed signals) may arrive at different sensors at different respective times/phases (e.g., being indicative of relative position and/or pointing direction, which may also be utilized in a pointing determination).

In a photo detector implementation (e.g., utilizing photo diodes), photo diodes may, for example, be tuned to react to particular light frequencies to reduce interference from output pixel light and/or associated reflections, ambient light, room lighting, etc. As a non-limiting example, photo diodes may be tuned to detect light that is not visible to the human eye, visible light frequencies that are relatively rare, light patterns that are unlikely to occur in a television program (e.g., particular pulse codes), etc. In one example, the photo detectors integrated with the television receiver 650 may comprise photo diodes that operate to detect energy from a laser pointer or directed infrared energy from the television control device 620 (or other pointing device). Note that analogously to the on-screen sensors discussed previously, various aspects may comprise mounting (e.g., adhering) sensors to various television receiver 650 locations and/or to various off-receiver components. Such sensor installation may, for example, occur at the factory or after-market by a technician or user.

In an antenna element implementation, an array of antenna elements may be positioned at locations on the television receiver 650 (e.g., only on the television receiver 650 and/or at locations around the television receiver 650). In an RF antenna implementation, passive antennas (or elements of an overall antenna matrix) may receive varying amounts of respective RF energy depending on the pointing direction of a directional RF source pointed at a location on the screen. Also for example, received signals (e.g., pulsed signals) may arrive at different antennas at different respective times/phases (e.g., being indicative of relative position and/or pointing direction, which may also be utilized in a pointing determination). Note that analogously to the on-screen sensors discussed previously, various aspects may comprise mounting (e.g., adhering) sensors to the television receiver 650. Such sensor installation may, for example, occur at the factory or after-market by a technician or user.

In an exemplary scenario, a user may point a pointing device (e.g., the remote control device 620, a laser pointer, directional RF transmitter, specifically designed eyewear, a mobile computing device, a mobile communication device, a gesture tracking device or glove, etc.) at the television screen 603, where the pointing device directs transmitted energy (e.g., light and/or RF energy and/or acoustic energy) at a particular location on the television screen 603 to which the user is pointing with the pointing device. Note that such transmitted energy will likely be transmitted directionally and be associated with an intensity or gain (or energy) pattern with the highest intensity at the center of the pattern (i.e., along the pointing line 625) and decreasing as a function of angle from the center of the pattern. Such a gain pattern was discussed previously in the discussion of FIG. 4.

In such an exemplary scenario, each sensor of the sensors integrated into the television receiver 650 off-television will likely receive some respective amount of energy. For example, along a particular axis, the sensor nearest to the screen pointing location 630 (i.e., along the pointing line 625) will likely receive the highest amount of energy, a sensor next nearest to the screen pointing location 630 will likely receive a next highest range of energy, and sensors away from the pointing location 630 will likely receive progressively less amounts of energy from the pointing device 620, as a function of distance from the pointing location 630 and/or angle off the pointing line 625 (e.g., until such energy is lost in the noise floor). For example, sensor 662 is nearest to the pointing location 630 and will likely receive the highest energy, sensors 661 and 663 are further from the pointing location 630, etc., and so on.

Note that in the implementation illustrated in FIG. 6, in particular since there are a relatively low number of sensors, signals from a same sensor may be utilized in determining multiple axes of pointing location. As mentioned previously, a calibration procedure may be performed when the system 600 is configured to assist in such pointing determination.

In an exemplary scenario, the television control device 620 (e.g., the user interface module 240 of the television control device 200 illustrated in FIG. 2) may receive signals indicative of the energy received by the sensors of the television receiver 650 (e.g., via the communication link 652 between the television control device 620 and the television receiver 650 and/or via a communication link directly between the television control device 620 and the sensors). The television receiver 650 may receive such signals in various manners, depending on the degree of integration of such sensors into the television receiver 650 and/or various components of the television system 600. For example, in an exemplary scenario where the sensors are fully integrated into the television receiver 650, the television control device 620 may receive such signals via communication link 652. Also for example, in a scenario where various sensors are off the television receiver 650, the television control device 620 may receive information from such sensors via direct communication link or via communication link with the various components with which such sensors are integrated.

The communication module 230 may then, for example, provide information of such received sensor signals to the sensor processing module 253 for processing. The sensor processing module 253 may then, for example, operate to process such information to determine the screen pointing location. The sensor processing module 253 may perform such processing in any of a variety of manners, non-limiting examples of which will be provided below.

In an exemplary scenario, the sensor processing module 253 may operate to estimate a position between sensor positions based on relative sensor energy. For example, in the horizontal dimension, sensor 662 may correspond to a relatively high amount of energy, and sensor 663 may correspond to a relatively low amount of received energy. The sensor processing module 253 may, for example, estimate a horizontal position relatively closer to sensor 662 by an amount proportional to the relative difference between respective amounts of energy. The sensor processing module 253 may perform a similar estimation utilizing sensors 661 and 664. Various horizontal position estimations may then be averaged. Alternatively for example, respective energies for the left side sensors 661, 662 may be averaged, respective energies for the right side sensors 663, 664 sensors may be averaged, and such left and right speaker average energies may then be utilized (e.g., in conjunction with energy pattern characteristics) to determine a horizontal pointing location. The sensor processing module 253 may then, for example, perform a similar pointing direction estimate in the vertical direction. Such horizontal and/or vertical positions may, for example, be translated between respective locations/directions of the sensor arrangement and respective locations/directions of the television screen 603. Calibrations procedures may, for example, be utilized to establish the spatial relationship between the sensor positioning and on-screen location.

In another exemplary scenario, a calibration procedure may be performed to determine an expected sensor energy level (e.g., absolute or relative) when the user is pointing at the sensor (and/or other known locations). In such a scenario, combined with a gain pattern and user (or pointing device) location relative to the television 601, a first line (e.g., a circle or arc) may be drawn around a first sensor 662. Similarly, a second line (e.g., a circle or arc) may be drawn around a second sensor 663, and the intersection of the first and second lines utilized as an estimate of pointing location. Additional lines associated with other sensors may also be utilized. Such additional lines may, for example, be utilized when selecting between multiple line intersections or to increase accuracy and/or resolution of the pointing determination. Note that such line intersection solution may be applied to any of the previously discussed scenarios (e.g., as illustrated in FIGS. 3-5) or other scenarios discussed herein. A non-limiting example of this was presented in the discussion of FIG. 3, and another example will be provided in the following discussion of FIG. 7.

After determining on-screen pointing location, the television receiver 650 may communicate information of such determined location in various manners. For example and without limitation, the sensor processing module 253 of the television control device 200 may utilize the television interface module 235 to communicate information of such on-screen pointing location to the television 601 for presentation to the user on the television screen 603. Also for example, the sensor processing module 253 may utilize the user interface module 240 to communicate information of such on-screen pointing location to the user (e.g., on a display of the television control device 620). Such communication will also be addressed in the discussions of FIGS. 9-10.

Figure 7:
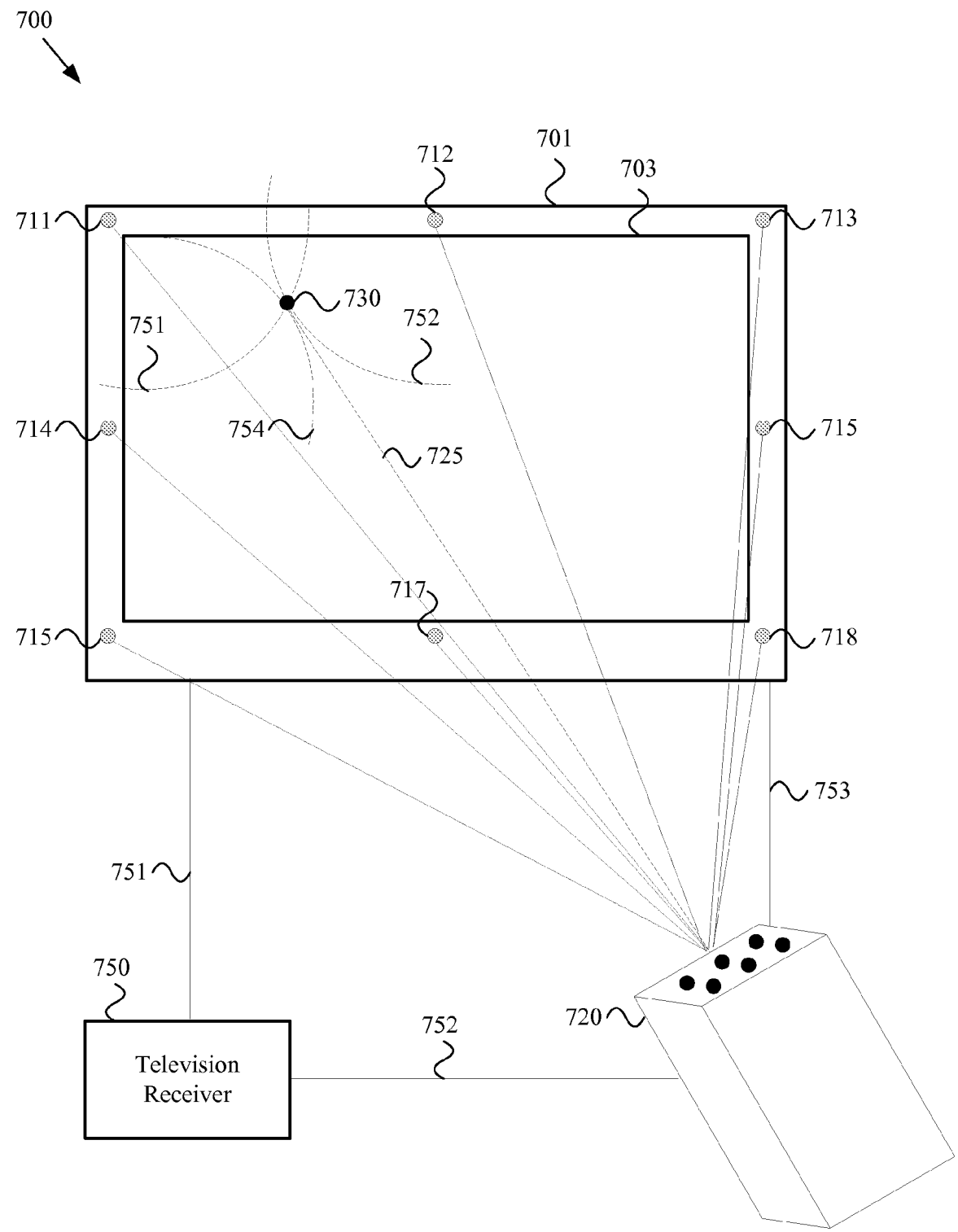
FIG. 7 is a diagram illustrating an exemplary television system with television controller sensors in accordance with various aspects of the present invention.

Various aspects of the present invention may also, for example, include one or more sensors incorporated into the pointing device (e.g., the television controller 200). FIG. 7 is a diagram illustrating an exemplary television system 700 utilizing pointing device sensors in accordance with various aspects of the present invention.

The exemplary television system 700 includes a television 701 having a television screen 703. The television system 700 also includes a television controller 720 (or other pointing device) pointing to an on-screen pointing location 730 along a pointing line 725 between the television controller 720 and the on-screen pointing location 730. The television controller 720 may, for example, share any or all aspects with the exemplary television controllers 160, 161, 200, 320, 420, 520 and 620 discussed previously and with all other television controllers discussed herein. Accordingly, various aspects of the television control device 720 will be explained herein with reference to various components of the exemplary television control device 200 illustrated in FIG. 2.

The television control device 720 may, for example, be communicatively coupled directly to the television 701 via a communication link 753. The television control device 720 may also, for example, be communicatively coupled directly to the television receiver 750 via communication link 752. The television control device 720 may additionally, for example, be communicatively coupled indirectly to the television 701 via the television receiver 750 through communication links 751 and 752. Accordingly, various aspects of the television control device 720 will be explained herein with reference to various components of the exemplary television control device 200 illustrated in FIG. 2.

The television system 700 also comprises a television receiver 750 that is communicatively coupled to the television 701 via a communication link 751 (e.g., a two-way communication link providing video information to the television 701 and/or receiving sensor information from the television 701). The exemplary television receiver 750 is also communicatively coupled to the television controller 720 via a communication link 752.

In such a configuration, sensor information may be communicated to the television control device 720 (e.g., via internal communication link). Such information may then be communicated to the sensor processing module 253 for the determination of an on-screen pointing location.

In the exemplary configuration, the television 701 includes eight emitters (e.g., light emitters, RF transmitters, etc.) located around the border of the television screen 703. Note that such emitters may be positioned anywhere proximate the television system 700. For example, the television 701 includes a first emitter 711, second emitter 712, third emitter 713, fourth emitter 714, fifth emitter 715, sixth emitter 716, seventh emitter 717 and eighth emitter 718. Such emitters may each emit a signal that may be received at sensors on-board the television control device 720. Such sensors may, for example, make up a directional receiver. In such a configuration, the controller 720 (or other pointing device) may be pointed to a location 730 on the screen 703 along a pointing line 725. With such an orientation and a directional signal reception pattern, the sensors on-board the controller 720 will receive the emitted signals at respective signal levels. Such sensor signals may then be processed in a manner similar to the manners discussed above to determine the on-screen pointing direction for the pointing device 720.

For example, through a calibration procedure, it may be known that the pointing device at a particular location should receive a particular amount of energy from each of the emitters 711-718 when pointed directly at such emitters (or at some other known location). In such a scenario, the pointing device (e.g., the user interface module 240 of the television control device 200) may measure respective signal energies received from each of the emitters (e.g., each distinguishable by frequency, coding, timing and/or timeslotting, etc.) and communicate such information to the television receiver 750.

The sensor processing module 253 may, for example, select a first emitter 712 (e.g., the emitter corresponding to the highest energy received at the pointing device). The sensor processing module 253 may then process the location of the pointing device, the receive gain pattern for the pointing device, and the energy received from the first emitter 712 to determine a first figure (e.g., an arc 752) along which the pointing device, if pointed, would be expected to receive the measured energy. Similarly, the sensor processing module 253 may perform such a procedure for a second emitter 711 resulting in a second figure (e.g., an arc 751). The intersection of such arcs may be utilized as an estimate of on-screen pointing location. Additionally, for accuracy or for selecting between multiple intersection points, should they occur, the sensor processing module 253 may perform such a procedure for a third emitter 714 resulting in a third figure (e.g., an arc 754), and so on. The intersection of the three arcs 752, 751, 754 may then be utilized as an estimate of on-screen pointing location.

Alternatively, the solution need not be based on a known position (location) of the pointing device, nor on absolute received energy levels. In such a scenario, differences in received energy from the various emitters may be processed with or without position information of the on-screen pointing device. For example, the pointing device 720 may have six degrees of freedom (e.g., three positional degrees of freedom and three orientational degrees of freedom). In such a scenario, if the position and orientation of the television 701 are known, the unknown six degrees of freedom for the pointing device 720 may be ascertained by processing six known values related to such six degrees of freedom (e.g., related by a known signal energy pattern). In such a scenario, measurements associated with six emitters on the television (and potentially more) may be utilized to solve for the six degrees of freedom of the pointing device 720.

The above-mentioned exemplary scenarios were presented to illustrate numerous manners in which the television control device 720 (e.g., sensor processing module 253) may operate to determine on-screen pointing location. Such examples are merely exemplary and thus the scope of various aspects of the present invention should not be limited by any particular characteristics of such examples unless explicitly claimed.

As discussed above, the calibration module 251 of the television control device 200 may operate to perform calibration operations. Such calibrating may be performed in any of a variety of manners. For example and without limitation, calibration may be utilized to determine expected received energy when transmitters and receivers are located and oriented in a particular manner. For example, a non-limiting example of a calibration procedure may comprise presenting an on-screen target at various locations and measuring respective sensor signals received when the pointing device is being pointed at such targets. Also for example, a calibration procedure may comprise directing a user (e.g., using the user interface module 240) to point to each of a plurality of sensors to determine an expected amount of received energy when the user is pointing directly at such sensors.

As mentioned previously, signal energy (or gain) pattern may be utilized in various on-screen pointing determinations. Such an energy (or gain) pattern may be predefined for a particular pointing device (e.g., at the factory), but may also be measured by the television control device 200. In a non-limiting example, the calibration module 251 may direct the user to utilize a pointing device to point to a location on the screen and process information received from multiple sensors (e.g., embedded in the screen, embedded in the television around the border of the screen, located in off-television devices, located on the television control device 720, located in the pointing device, etc.) to develop a custom gain pattern for the particular pointing device (e.g., for the television control device 200). For example, such calibration may determine the shape of the gain pattern, the signal energy falloff characteristics, etc.

Various aspects discussed above included the processing of position information. In such exemplary cases, the television control device 200 may comprise one or more location modules 252 that operate to determine relevant position information. The location module 252 may operate to perform such location determining (e.g., of the user or pointing device and/or the television) in any of a variety of manners. For example, the location module 252 may utilize a communication interface module 210, 220 to receive position information (e.g., of the television control device 200 or other pointing device) from an external source of such information (e.g., global positioning system, cellular triangulation system, home triangulation system, etc.).

Also for example, the location module 252 may receive position information from internal components of the television control device 200 (e.g., where such television control device 200 has position-determining capability). For example, in a non-limiting exemplary scenario, where the television control device 200 is a handheld computer, such computer may comprise GPS (or A-GPS) capability to determine its position. In such a scenario, the television control device 200 location module 252 may wirelessly communicate information of the television control device's position to the sensor processing module 253.

Additionally for example, the location module 232 may operate to process sensor information to determine location of the pointing device (e.g., location in relation to the television screen). For example, as mentioned previously, a signal (e.g., a pulse) transmitted from a pointing device to the television (or vice versa) will arrive at different sensors at different points in time depending on the respective distance from the pointing device to each sensor. The location module 232 may process such time-of-arrival information at various sensors to determine the position of the pointing device relative to the television. Similarly, in a scenario including signal emitters associated with the television and sensors on the pointing device, simultaneously transmitted signals (or signals transmitted with a known temporal pattern) from different emitters will arrive at the pointing device at different respective times depending on the position of the pointing device relative to such emitters. Alternatively, the location module 232 may also operate to process phase difference information (in addition to timing information or instead of such information) to determine pointing device location.

Once the television control device 200 (e.g., the sensor processing module 253) determines an on-screen pointing location, the television control device 200 may utilize such information in any of a variety of manners. For example and without limitation, the sensor processing module 253 may operate to generate information of the determined on-screen pointing location, and one or more modules of the television control device 200 may operate to communicate a signal (e.g., to a television, television receiver, other display device, U/I modules 240 of the television control device 200, etc.) that comprises characteristics that cause presentation of a visual indication (e.g., on the television screen, controller screen, other display, etc.) to indicate to the user the on-screen location to which the television control device 200 has determined the user is pointing. Such a visual indication may, for example, comprise characteristics of a cursor or other graphical construct, bright spot, highlighting, color variation, brightness variation, etc. For example, the television 701 or television control device 720 may operate to overlay such indication on video content (e.g., television programming) being presented to the user (e.g., presented on the television screen, presented on a screen of the television controller, etc.).

Additionally for example, the sensor processing module 253 may provide information of the determined on-screen pointing location to one or more other modules of the television control device 200 (e.g., the processing module 250 and/or other modules thereof) to identify an object in video content (e.g., television programming) to which a user is pointing. In such an exemplary scenario, one or more modules of the television control device 200 may operate to communicate signals (e.g., to a television, other modules of the television controller having a screen, other display device, etc.) that cause highlighting of an object to which the user is pointing and/or provide information regarding such object.

Further for example, various modules of the television control device 200 (e.g., the processor module 250) may operate to communicate on-screen pointing location information to television system components separate from the television (e.g., to a television receiver, video recorder, remote programming source, communication network infrastructure, advertising company, provider of goods and/or services, etc.).

Figure 8:
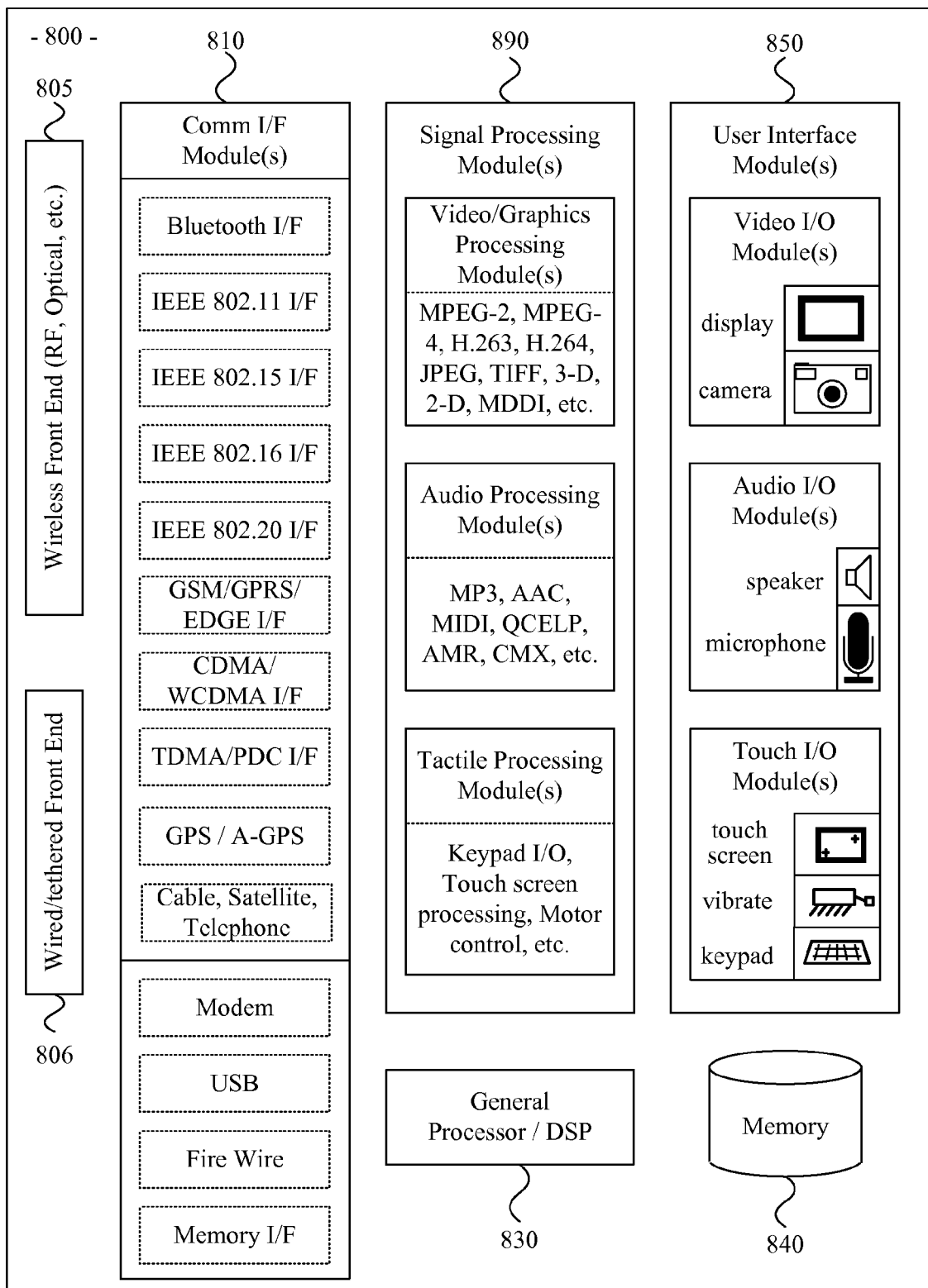
FIG. 8 is a diagram illustrating an exemplary television control device in accordance with various aspects of the present invention.

FIG. 2 provided a diagram illustrating an exemplary television control device 200 in accordance with various aspects of the present invention. FIG. 8 provides another diagram illustrating an exemplary television control device 800 in accordance with various aspects of the present invention. The exemplary television control device 800 may share any or all aspects with any of the television control devices discussed herein and illustrated in FIGS. 1-7. For example, the exemplary television control device 800 (or various modules thereof) may operate to perform any or all functionality discussed herein. As with the exemplary television control device 200, the components of the exemplary television control device 800 may be co-located a single housing.

For example, the television control device 800 comprises a processor 830. Such a processor 830 may, for example, share any or all characteristics with the processor 250 discussed with regard to FIG. 2. Also for example, the television control device 800 comprises a memory 840. Such memory 840 may, for example, share any or all characteristics with the memory 260 discussed with regard to FIG. 2.

Also for example, the television control device 800 may comprise any of a variety of user interface module(s) 850. Such user interface module(s) 850 may, for example, share any or all characteristics with the user interface module(s) 240 discussed previously with regard to FIG. 2. For example and without limitation, the user interface module(s) 850 may comprise: a display device, a camera (for still or moving picture acquisition), a speaker, an earphone (e.g., wired or wireless), a microphone, a video screen (e.g., a touch screen display), a vibrating mechanism, a keypad, a remote control interface, and/or any of a variety of other user interface devices (e.g., a mouse, a trackball, a touch pad, touch screen, light pen, game controlling device, etc.).

The exemplary television control device 800 may also, for example, comprise any of a variety of communication modules (805, 806, and 810). Such communication module(s) may, for example, share any or all characteristics with the communication interface module(s) 210, 220 discussed previously with regard to FIG. 2. For example and without limitation, the communication interface module(s) 810 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, component and/or composite video, Ethernet, wireline and/or cable modem, etc.); any of a variety of communication interface modules related to communicating with external memory devices; etc. The exemplary television control device 800 is also illustrated as comprising various wired 806 and/or wireless 805 front-end modules that may, for example, be included in the communication interface modules and/or utilized thereby.

The exemplary television control device 800 may also comprise any of a variety of signal processing module(s) 890. Such signal processing module(s) 890 may, for example, be utilized to assist in processing various types of information discussed previously (e.g., with regard to sensor processing, position determination, video processing, image processing, audio processing, general user interface information data processing, etc.). For example and without limitation, the signal processing module(s) 890 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

Various aspects of the present invention were previously exemplified by non-limiting illustrations and described in terms of operations performed by various modules of the television. Various aspects of the present invention will now be illustrated in the form of method flow diagrams.

Figure 9:
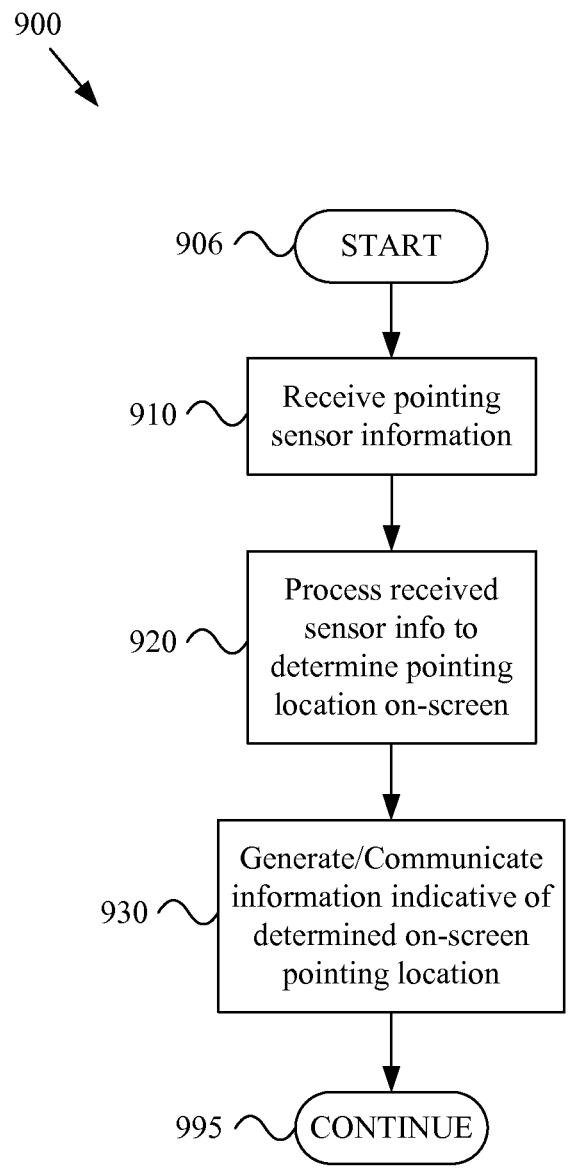
FIG. 9 is a flow diagram illustrating the generation of on-screen pointing information in accordance with various aspects of the present invention.

FIG. 9 is a flow diagram 900 illustrating the generation of on-screen pointing information (e.g., in a television control device) in accordance with various aspects of the present invention. The exemplary method 900 may, for example, share any or all characteristics with the television control device operation discussed previously. For example, the exemplary method 900 may be implemented by any or all of the television control devices (e.g., 160, 161, 200, 220, 320, 420, 520, 620, 720 and 800) discussed previously. Conversely, the exemplary method 900 may comprise any or all functional aspects discussed previously with regard to such exemplary television control devices.

The exemplary method 900 may begin executing at step 905. The exemplary method 900 may begin executing in response to any of a variety of causes and/or conditions. For example and without limitation, the method 900 may begin executing in response to a user command to begin, detected user interaction with a pointing device (e.g., a television controller), detected user presence in the vicinity, detected user interaction with a television implementing the method 900, etc. Also for example, the method 900 may begin executing in response to a television presenting programming or other video content for which on-screen pointing is enabled and/or relevant.

The exemplary method 900 may, for example at step 910, comprise receiving pointing sensor information. For example and without limitation, step 910 may comprise any or all sensor information receiving characteristics described previously with regard the various modules of the exemplary television control devices illustrated in FIGS. 1-8 and discussed previously. For example, step 910 may share any or all sensor information receiving characteristics discussed previously with regard to at least the user interface module 240, television interface module 235, processor module 250, communication interface modules 210, 220, sensor processing module 253, location module 252 and calibration module 251.

Step 910 may, for example, comprise receiving sensor information from (or associated with) sensors integrated in the television control device. Also for example, step 910 may comprise receiving sensor information from (or associated with) off-controller sensors (e.g., integrated with or attached to a television, off-television sensors, sensors integrated with a pointing device different from the television control device, sensors integrated with a television receiver, etc. As discussed previously, such sensors may comprise any of a variety of characteristics, including without limitation, characteristics of light sensors, RF sensors, acoustic sensors, active and/or passive sensors, etc.

In general, step 910 may comprise receiving pointing sensor information. Accordingly, the scope of various aspects of the present invention should not be limited by characteristics of any particular manner of receiving pointing sensor information unless explicitly claimed.

The exemplary method 900 may, at step 920, comprise processing received sensor information (e.g., as received at step 910) to determine a location on a screen of the television to which a user is pointing (e.g., pointing with a pointing device). For example and without limitation, step 920 may comprise any or all pointing location processing characteristics described previously with regard the various modules of the exemplary television controllers illustrated in FIGS. 1-8 and discussed previously. For example, step 920 may share any or all pointing location determining characteristics discussed previously with regard to at least the processor module 250, sensor processing module 253, location module 252 and calibration module 251.

Step 920 may, for example, comprise determining on-screen pointing location in any of a variety of manners. For example, step 920 may comprise determining on-screen pointing location based on a location of a selected sensor, based on interpolation between sensor locations (e.g., linear and/or non-linear interpolation), based on determining energy pattern intersection(s), etc. Many examples of such determining were provided previously.

In general, step 920 may comprise processing received sensor information (e.g., independently and/or in conjunction with other information) to determine a location on a screen of the television to which a user is pointing (e.g., while the television is presenting programming to the user). Accordingly, the scope of various aspects of the present invention should not be limited by characteristics of any particular manner of performing such processing unless explicitly claimed.

The exemplary method 900 may, at step 930, comprise generating information indicative of a determined on-screen pointing location (e.g., as determined at step 920). For example and without limitation, step 930 may comprise any or all pointing location information generation characteristics described previously with regard the various modules of the exemplary television control devices illustrated in FIGS. 1-8 and discussed previously. For example, step 930 may share any or all information generation characteristics discussed previously with regard to at least the processor module 250, sensor processing module 253, location module 252, calibration module 251, television interface module 235, user interface module 240 and/or communication interface modules 210, 220.

Step 930 may, for example, comprise generating such information in any of a variety of manners. For example, step 930 may comprise generating on-screen pointing location data to communicate to internal modules of the television control device, to equipment external to the television control device (e.g., to the television and/or television receiver), to television network components, to a television programming source, etc. Such information may, for example, be communicated to various system components and may also be presented to the user (e.g., utilizing visual feedback displayed on a screen of a television, television controller, etc.). Such information may, for example, be generated in the form of screen coordinates, identification of a video content object (e.g., a programming object or person) to which an on-screen pointing location corresponds, generation of an on-screen cursor or highlight or other graphical feature, etc.

In general, step 930 may comprise generating information indicative of a determined on-screen pointing location. Accordingly, the scope of various aspects of the present invention should not be limited by characteristics of any particular manner of generating such information unless explicitly claimed.

The exemplary method 900 may, at step 995, comprise performing continued processing. Such continued processing may comprise characteristics of any of a variety of types of continued processing, various examples of which were presented previously. For example and without limitation, step 995 may comprise looping execution flow back up to any earlier step (e.g., step 910). Also, in a non-limiting exemplary scenario, step 995 may comprise presenting a graphical feature on a television control device screen indicative of where the user is pointing on a television screen. In another exemplary scenario, step 995 may comprise communicating information to a television that causes the television to output a graphical feature on the television screen indicative of where the user is pointing (e.g., such information may comprise characteristics that cause the television to overlay such graphical indication on programming being presented on the television screen. Additionally for example, step 995 may comprise presenting (or causing the presentation of) visual feedback indicia of the on-screen pointing location for a user. Further for example, step 995 may comprise communicating information of the on-screen pointing location to system components external to the television control device implementing the method 900 (e.g., to a television, television receiver, another television controller, etc.). Further for example, step 995 may comprise utilizing the on-screen pointing information to identify a video content object (e.g., an object presented in television programming) to which a user is pointing, etc.

In general, step 995 may comprise performing continued processing. Accordingly, the scope of various aspects of the present invention should not be limited by characteristics of any particular manner of performing continued processing unless explicitly claimed.

Figure 10:
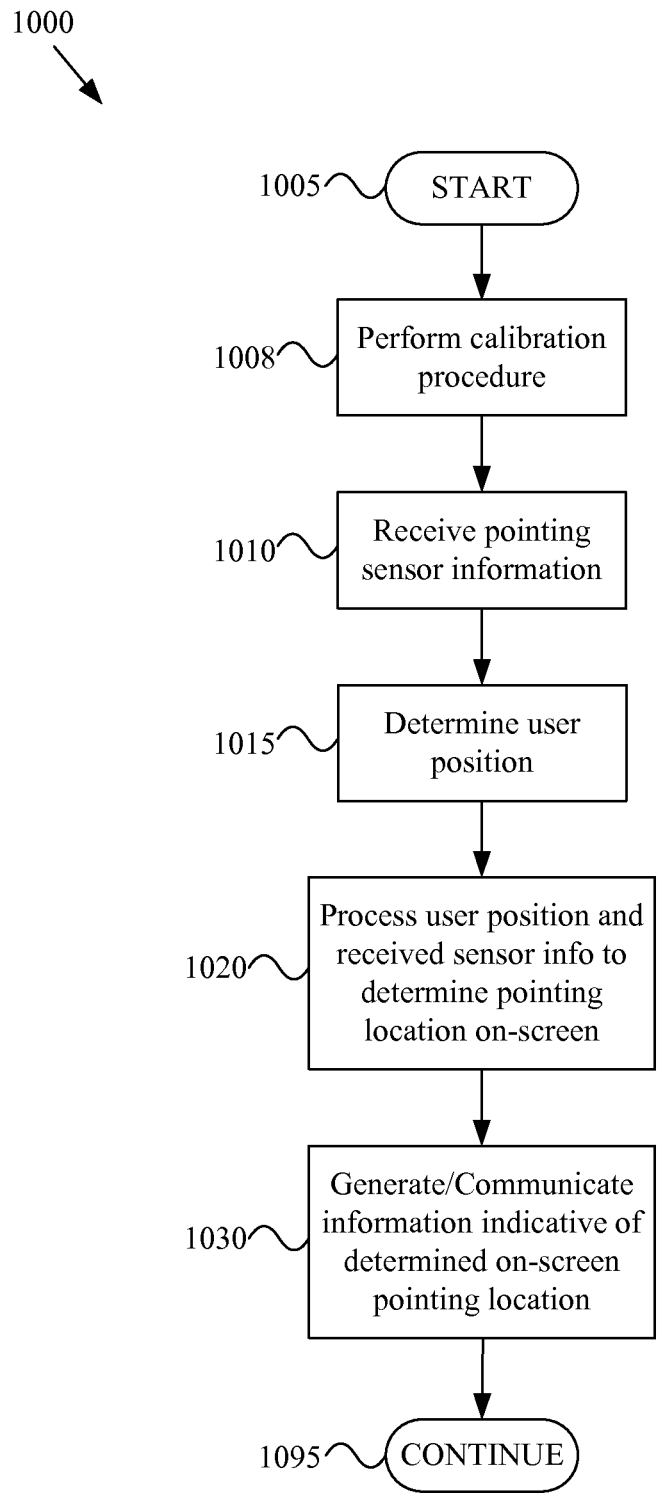
FIG. 10 is a flow diagram illustrating the generation of on-screen pointing information in accordance with various aspects of the present invention.

Turning next to FIG. 10, such figure is a flow diagram 1000 illustrating the generation of on-screen pointing information (e.g., in a television control device) in accordance with various aspects of the present invention. The exemplary method 1000 may, for example, share any or all characteristics with the television control device operation discussed previously (e.g., in reference to FIGS. 1-9).

The exemplary method 1000 may begin executing at step 1005. Step 1005 may, for example, share any or all characteristics with step 905 of the exemplary method 900 illustrated in FIG. 9 and discussed previously.

The exemplary method 1000 may, for example at step 1008, comprise performing a calibration procedure with the user. Such a calibration procedure may, for example, be performed to develop a manner of processing received sensor information to determine on-screen pointing location. Step 1008 may, for example, comprise any or all calibration aspects discussed previously (e.g., with reference to the calibration module 251).

The exemplary method 1000 may, for example at step 1010, comprise receiving pointing sensor information. For example and without limitation, step 1010 may comprise any or all sensor information receiving characteristics described previously with regard the various modules of the exemplary television control devices illustrated in FIGS. 1-8 and FIG. 9 (e.g., step 910) and discussed previously.

The exemplary method 1000 may, for example at step 1015, comprise determining user position (e.g., determining position of a user pointing device). For example and without limitation, step 1015 may comprise any or all position determining characteristics discussed previously with regard to FIGS. 1-9. Note that position may also, for example, include orientation.

For example, step 1015 may share any or all position determining characteristics discussed previously with regard to at least the processor module 250, sensor processing module 253, location module 252 and calibration module 251. For example, step 1015 may comprise determining user position based, at least in part, on received sensor signals. Also for example, step 1015 may comprise determining user position based, at least in part, on position information received from one or more systems external to the television control device implementing the method 1000.

In general, step 1015 may comprise determining user position (e.g., pointing device position). Accordingly, the scope of various aspects of the present invention should not be limited by characteristics of any particular manner of determining user position unless explicitly claimed.

The exemplary method 1000 may, for example, at step 1020, comprise processing received sensor information (e.g., as received at step 1010) and/or user position information (e.g., as determined at step 1015) to determine a location on a screen of the television to which a user is pointing (e.g., pointing with the television control device implementing the method or other pointing device). For example and without limitation, step 1020 may comprise any or all pointing location determination characteristics described previously with regard the various modules of the exemplary television control devices illustrated in FIGS. 1-8 and FIG. 9 (e.g., step 920) and discussed previously. For example, step 1020 may share any or all pointing location determining characteristics discussed previously with regard to at least the processor module 250, sensor processing module 253, location module 252 and calibration module 251.

Step 1020 may, for example, comprise determining on-screen pointing location in any of a variety of manners. For example, step 1020 may comprise determining on-screen pointing location based on a location of a selected sensor, based on location of the pointing device, based on interpolation between sensor locations (e.g., linear and/or non-linear interpolation), based on energy pattern intersection points, etc. Many examples of such determining were provided previously.

In general, step 1020 may comprise processing received sensor information and/or user position information to determine a location on a screen of the television to which a user is pointing (e.g., pointing with the television control device implementing the method 1000 or other pointing device). Accordingly, the scope of various aspects of the present invention should not be limited by characteristics of any particular manner of performing such processing unless explicitly claimed.

The exemplary method 1000 may, at step 1030, comprise generating information indicative of a determined on-screen pointing location (e.g., as determined at step 1020). For example and without limitation, step 1030 may comprise any or all information generation characteristics described previously with regard the various modules of the exemplary television control devices illustrated in FIGS. 1-8 and FIG. 9 (e.g., step 930) and discussed previously. For example, step 1030 may share any or all information generation characteristics discussed previously with regard to at least the processor module 250, sensor processing module 253, location module 252, calibration module 251, television interface module 235, user interface module 240 and/or communication interface modules 210, 220.

The exemplary method 1000 may, at step 1095, comprise performing continued processing. Such continued processing may comprise characteristics of any of a variety of types of continued processing, various examples of which were presented previously. For example and without limitation, step 1095 may comprise looping execution flow back up to any earlier step (e.g., step 1008). Also, in a non-limiting exemplary scenario, step 1095 may comprise presenting a graphical feature on a television control device screen indicative of where the user is pointing on a television screen. In another exemplary scenario, step 1095 may comprise communicating information to a television that causes the television to output a graphical feature on the television screen indicative of where the user is pointing (e.g., such information may comprise characteristics that cause the television to overlay such graphical indication on programming being presented on the television screen. Additionally for example, step 1095 may comprise presenting (and/or causing the presentation of) visual feedback indicia of the on-screen pointing location for a user. Further for example, step 1095 may comprise communicating information of the on-screen pointing location to system components external to the television receiver implementing the method 1000. Further for example, step 1095 may comprise utilizing the on-screen pointing information to identify a video content object (e.g., an object presented in television programming) to which a user is pointing, etc.

In general, step 1095 may comprise performing continued processing. Accordingly, the scope of various aspects of the present invention should not be limited by characteristics of any particular manner of performing continued processing unless explicitly claimed.

In summary, various aspects of the present invention provide a system and method in a television controller (e.g., a television control device) for generating screen pointing information. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing

What is claimed is:

1. A method for determining an on-screen pointing location, the method comprising:
   by a television control device:
   transmitting an emission to a screen of a television;
   receiving a plurality of signals, each signal of the plurality of signals capable of indicating a different amount of energy received by a respective sensor of a plurality of sensors located on at least one of the television, a television receiver, or at least one speaker; and
   determining the on-screen pointing location pointed to by the television control device based on the energies indicated by the plurality of signals.

2. The method of claim 1 wherein the television is presenting television programming on the screen during the transmitting.

3. The method of claim 1 wherein the emission is imperceptible to a user.

4. The method of claim 3 wherein the emission is a light emission at a light frequency that is imperceptible to the user.

5. The method of claim 3 wherein the emission is an acoustic emission at an acoustic frequency that is imperceptible to the user.

6. The method of claim 1 wherein the plurality of sensors are located on the screen of the television.

7. The method of claim 6 wherein the plurality of sensors are overlaid on the screen of the television.

8. The method of claim 6 wherein the plurality of sensors are integrated into an on-screen portion of the television.

9. The method of claim 1 wherein the plurality of sensors are located on an off-screen portion of the television.

10. The method of claim 1 wherein the plurality of signals is received by the television control device independent of information communicated between the television and the television control device.

11. The method of claim 1 wherein the plurality of signals are received by the television control device over at least one communication link over which video information is communicated between the television and the television control device.

12. The method of claim 1 wherein the determining of the on-screen pointing location pointed to by the television control device is further based on positional information of the television control device.

13. The method of claim 1 wherein the determining of the on-screen pointing location pointed to by the television control device is further based on phase differences between arrivals at the television control device of each signal of the plurality of signals.

14. The method of claim 1 wherein the determining of the on-screen pointing location pointed to by the television control device is further based on phase differences between arrivals at the plurality of sensors of the emission.

15. A method for determining an on-screen pointing location, the method comprising:
   detecting, by a plurality of sensors, an emission pointed to a screen of a television by a television control device, the plurality of sensors located on at least one of the television, a television receiver, or at least one speaker; and
   transmitting a plurality of signals to the television control device, each signal of the plurality of signals indicating an amount of energy received by a respective sensor of the plurality of sensors, each signal capable of indicating a different amount of energy received by each of the sensors, wherein the on-screen pointing location pointed to by the television control device is determined by the television control device based on the energies of the plurality of signals.

16. The method of claim 15 wherein the emission is imperceptible to a user.

17. The method of claim 16 wherein the emission is a light emission at a light frequency that is imperceptible to the user.

18. The method of claim 16 wherein the emission is an acoustic emission at an acoustic frequency that is imperceptible to the user.

19. The method of claim 15 wherein the plurality of sensors are located on the screen of the television.

20. The method of claim 19 wherein the plurality of sensors are overlaid on the screen of the television.

21. The method of claim 15 wherein the plurality of sensors are located on an off-screen portion of the television.

22. The method of claim 15 wherein the plurality of sensors are located on the television receiver.

23. The method of claim 15 wherein the plurality of sensors are located on the at least one speaker.

24. The method of claim 15 wherein the plurality of signals are transmitted to the television control device over a communication link that is independent of a communication link over which television control information is communicated between the television and the television control device.

25. The method of claim 15 wherein the plurality of signals are transmitted to the television control device over a communication link over which video information is communicated between the television and the television control device.

26. The method of claim 15 wherein the on-screen pointing location pointed to by the television control device is determined further based on temporal differences or phase differences between arrivals at the television control device of each signal of the plurality of signals.

27. The method of claim 15 wherein the on-screen pointing location pointed to by the television control device is determined further based on temporal differences or phase differences between arrivals at the plurality of sensors of the emission.

28. A television control device comprising:
   an emission source operable to transmit an emission to a screen of a television, wherein the television is operable to present television programming on the screen;
   at least one communication interface operable to receive a plurality of signals, each signal of the plurality of signals corresponding to each of a plurality of sensors located on at least one of the television, a television receiver, or at least one speaker, and each signal indicates an amount of energy incident on the corresponding sensor; and
   a processor in communication with the at least one communication interface, the processor operable to determine an on-screen pointing location pointed to by the television control device based on the energies of the plurality of signals.

29. The method of claim 5 further comprising processing phase differences of each signal of the plurality of signals to determine a pointing direction of the television control device relative to a plurality of known locations of the plurality of sensors.

30. The method of claim 27 wherein the temporal differences or phase differences are processed to determine the location of the television control device relative to the plurality of sensors.

31. The device of claim 28 wherein the processor is further operable to determine the on-screen pointing location based on temporal differences of a timing of arrival of each signal of the plurality of signals upon arrival to the plurality of sensors.

32. The device of claim 28 wherein the processor is further operable to determine the on-screen pointing location based on a phase of each signal of the plurality of signals upon arrival to the plurality of sensors.

* * * * *